(12) United States Patent
Sun et al.

(10) Patent No.: US 11,812,308 B2
(45) Date of Patent: Nov. 7, 2023

(54) MULTIPLE TRANSMISSION OPPORTUNITY RESOURCE RESERVATION FOR SIDELINK COMMUNICATION

(71) Applicant: QUALCOMM Incorporated, San Diego, CA (US)

(72) Inventors: Jing Sun, San Diego, CA (US); Xiaoxia Zhang, San Diego, CA (US); Tao Luo, San Diego, CA (US); Yisheng Xue, San Diego, CA (US); Juan Montojo, San Diego, CA (US); Peter Gaal, San Diego, CA (US); Shailesh Patil, San Diego, CA (US); Tien Viet Nguyen, Bridgewater, NJ (US); Shuanshuan Wu, San Diego, CA (US); Arthur Gubeskys, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 17/393,561

(22) Filed: Aug. 4, 2021

(65) Prior Publication Data

US 2022/0060944 A1 Feb. 24, 2022

Related U.S. Application Data

(60) Provisional application No. 62/706,539, filed on Aug. 24, 2020.

(51) Int. Cl.
*H04W 28/26* (2009.01)
*H04W 72/0453* (2023.01)
*H04W 72/0446* (2023.01)
*H04W 72/20* (2023.01)
*H04W 72/56* (2023.01)

(52) U.S. Cl.
CPC ....... *H04W 28/26* (2013.01); *H04W 72/0446* (2013.01); *H04W 72/0453* (2013.01); *H04W 72/20* (2023.01); *H04W 72/56* (2023.01)

(58) Field of Classification Search
None
See application file for complete search history.

(56) References Cited

U.S. PATENT DOCUMENTS

| 2018/0213438 A1* | 7/2018 | Muraoka | H04W 72/20 |
| 2020/0029340 A1 | 1/2020 | He et al. | |
| 2020/0037343 A1 | 1/2020 | He et al. | |

(Continued)

FOREIGN PATENT DOCUMENTS

| WO | WO-2020033704 A1 | 2/2020 | |
| WO | WO-2020069111 A1 * | 4/2020 | ............ H04W 72/02 |

OTHER PUBLICATIONS

International Search Report and Written Opinion—PCT/US2021/071116—ISA/EPO—dated Dec. 2, 2021.

*Primary Examiner* — The Hy Nguyen
(74) *Attorney, Agent, or Firm* — QUALCOMM Incorporated

(57) ABSTRACT

Various aspects of the present disclosure generally relate to wireless communication. In some aspects, a user equipment (UE) may configure sidelink control information (SCI) to indicate a plurality of sidelink transmission opportunities that are to be reserved for the UE. The UE may transmit the SCI to one or more other UEs. Numerous other aspects are provided.

15 Claims, 15 Drawing Sheets

(56) References Cited

U.S. PATENT DOCUMENTS

| | | | |
|---|---|---|---|
| 2020/0228247 A1* | 7/2020 | Guo | H04L 1/0025 |
| 2020/0236655 A1 | 7/2020 | Bharadwaj et al. | |
| 2021/0144750 A1* | 5/2021 | Cao | H04W 72/0453 |
| 2021/0321396 A1* | 10/2021 | Li | H04W 72/0446 |
| 2022/0078845 A1* | 3/2022 | Xu | H04L 5/0037 |
| 2022/0303059 A1* | 9/2022 | Hahn | H04L 1/1896 |
| 2022/0400527 A1* | 12/2022 | Yoon | H04W 72/0446 |

\* cited by examiner

MULTIPLE TRANSMISSION OPPORTUNITY RESOURCE RESERVATION FOR SIDELINK COMMUNICATION

CROSS-REFERENCE TO RELATED APPLICATION

This Patent Application claims priority to U.S. Provisional Patent Application No. 62/706,539, filed on Aug. 24, 2020, entitled "MULTIPLE TRANSMISSION OPPORTUNITY RESOURCE RESERVATION FOR SIDELINK COMMUNICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for multiple transmission opportunity resource reservation for sidelink communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes configuring sidelink control information (SCI) to indicate a plurality of sidelink transmission opportunities that are to be reserved for the UE; and transmitting the SCI to one or more other UEs.

In some aspects, a method of wireless communication performed by a first UE includes receiving SCI that indicates a plurality of sidelink transmission opportunities that are to be reserved for a second UE; and refraining from, based at least in part on the SCI, using radio resources associated with one or more sidelink transmission opportunities of the plurality of sidelink transmission opportunities.

In some aspects, a UE for wireless communication includes a memory and one or more processors coupled to the memory, the one or more processors configured to configure SCI to indicate a plurality of sidelink transmission opportunities that are to be reserved for the UE; and transmitting the SCI to one or more other UEs.

In some aspects, a first UE for wireless communication includes a memory and one or more processors coupled to the memory, the one or more processors configured to receive SCI that indicates a plurality of sidelink transmission opportunities that are to be reserved for a second UE; and refrain from, based at least in part on the SCI, using radio resources associated with one or more sidelink transmission opportunities of the plurality of sidelink transmission opportunities.

In some aspects, a non-transitory computer-readable medium storing a set of instructions for wireless communication includes one or more instructions that, when executed by one or more processors of a UE, cause the UE to configure SCI to indicate a plurality of sidelink transmission opportunities that are to be reserved for the UE; and transmitting the SCI to one or more other UEs.

In some aspects, a non-transitory computer-readable medium storing a set of instructions for wireless communication includes one or more instructions that, when executed by one or more processors of a first UE, cause the first UE to receive SCI that indicates a plurality of sidelink transmission opportunities that are to be reserved for a second UE; and refrain from, based at least in part on the SCI, using radio resources associated with one or more sidelink transmission opportunities of the plurality of sidelink transmission opportunities.

In some aspects, an apparatus for wireless communication includes means for configuring SCI to indicate a plurality of sidelink transmission opportunities that are to be reserved for the apparatus; and means for transmitting the SCI to one or more other apparatuses.

In some aspects, an apparatus for wireless communication includes means for receiving SCI that indicates a plurality of sidelink transmission opportunities that are to be reserved for a second apparatus; and means for refraining from, based at least in part on the SCI, using radio resources associated with one or more sidelink transmission opportunities of the plurality of sidelink transmission opportunities.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
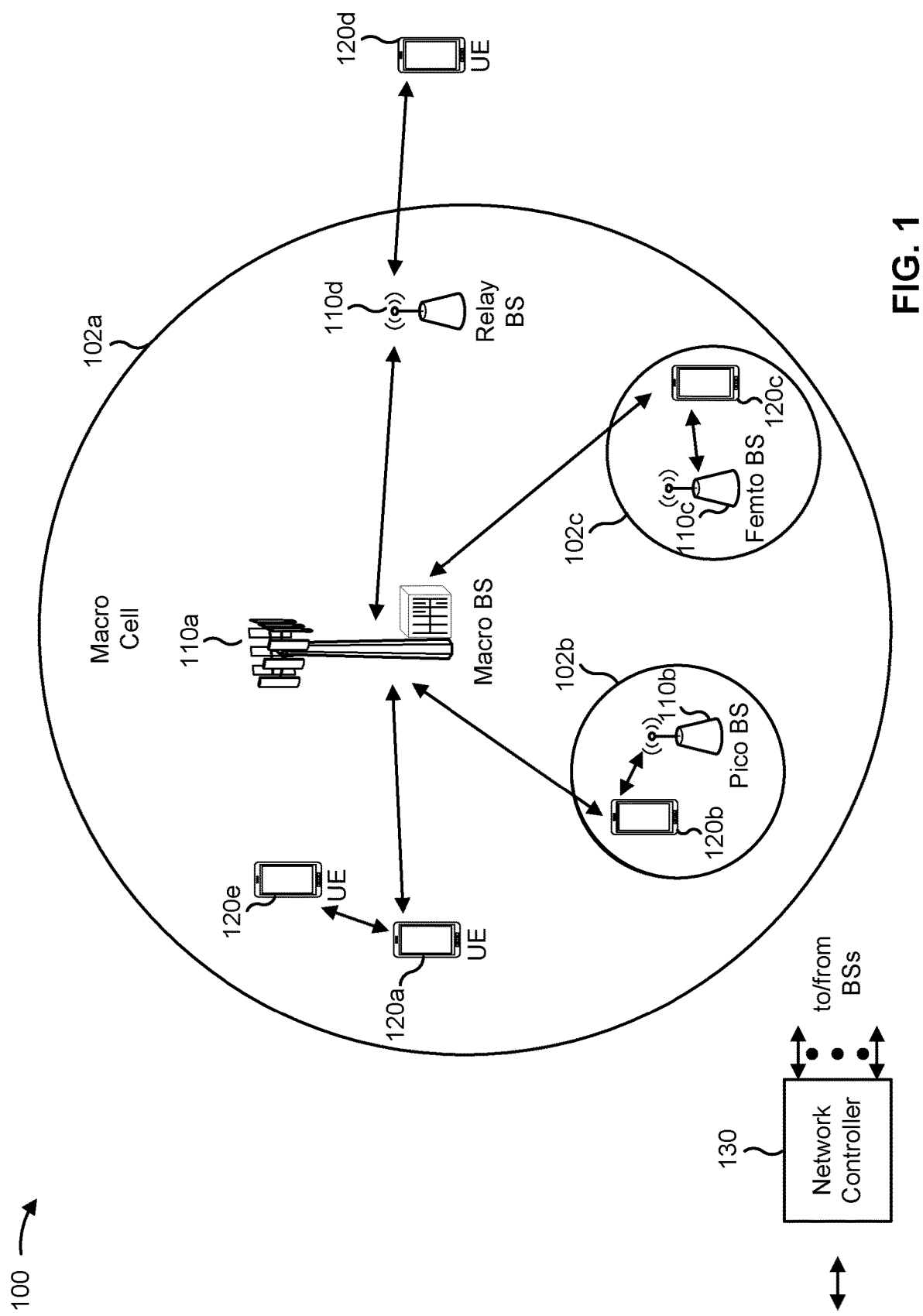
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
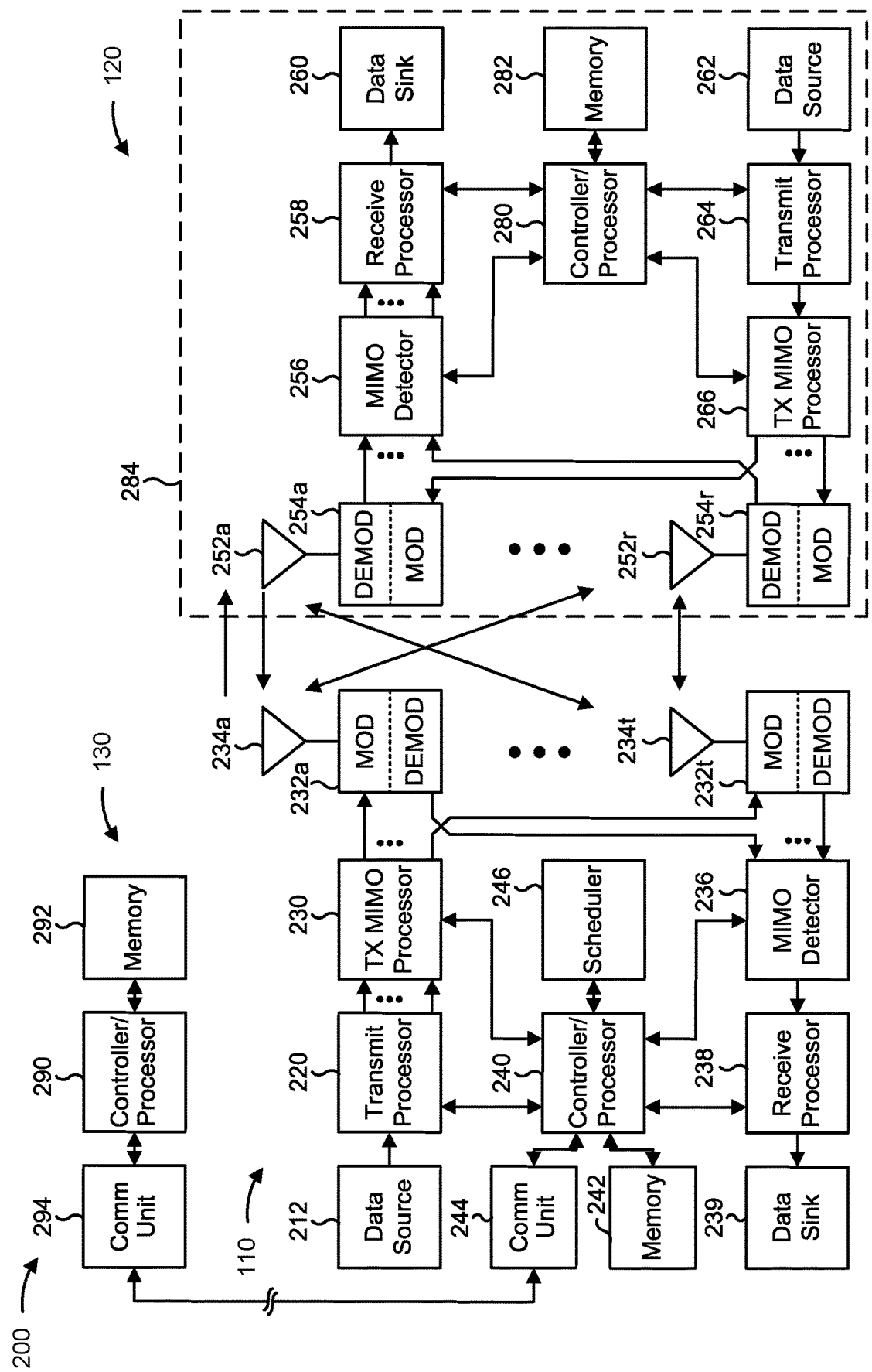
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5A-5H, 6, and/or 7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5A-5H, 6, and/or 7).

Controller/processor 240 of base station 110, controller/processor 280 of UE 120, and/or any other component(s) of FIG. 2 may perform one or more techniques associated with multiple transmission opportunity resource reservation for sidelink communication, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for configuring SCI to indicate a plurality of sidelink transmission opportunities that are to be reserved for the UE 120, means for transmitting the SCI to one or more other UEs 120, and/or the like. In some aspects, UE 120 may include means for receiving SCI that indicates a plurality of sidelink transmission opportunities that are to be reserved for another UE 120, means for refraining from, based at least in part on the SCI, using radio resources associated with one or more sidelink transmission opportunities of the plurality of sidelink transmission opportunities, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
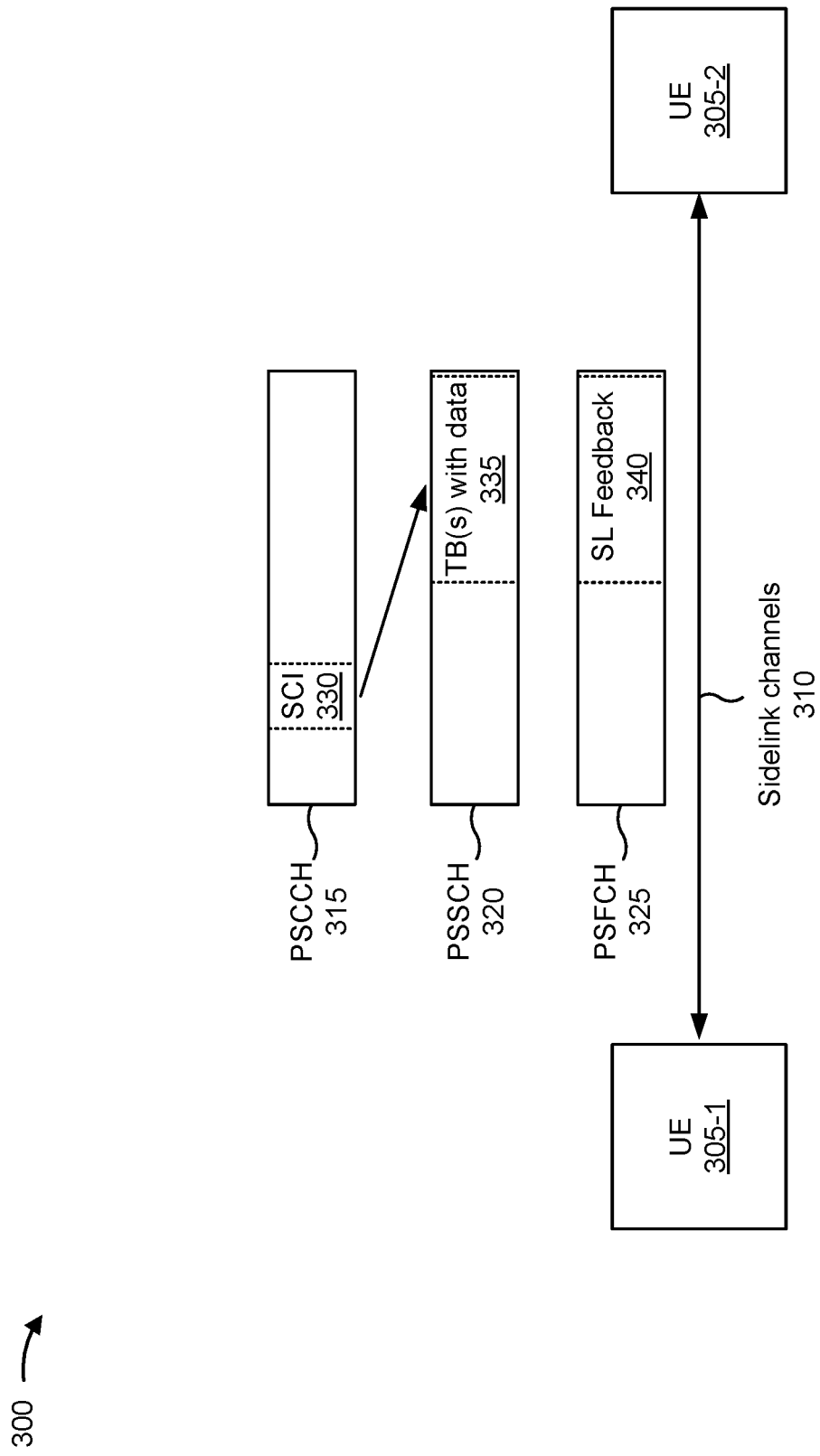
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle to pedestrian (V2P) communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, an MCS to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
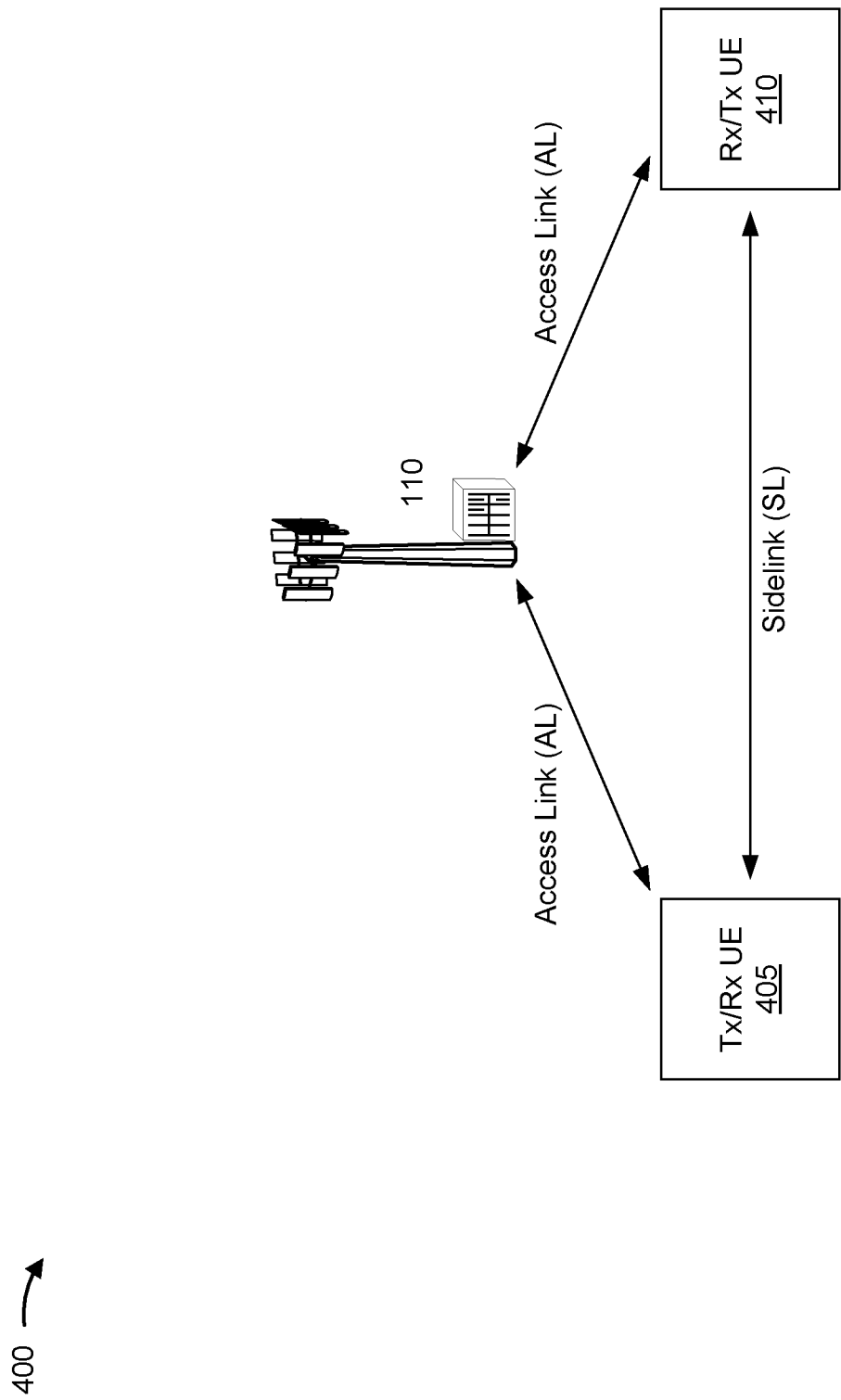
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

In a shared or unlicensed frequency band, a UE may contend against other UEs for channel access before transmitting on a sidelink channel to reduce and/or prevent collisions on the sidelink channel. To contend for channel access, the UE may perform a channel access procedure, such as a listen-before-talk (or listen-before-transmit) (LBT) procedure or another type of channel access procedure, for shared or unlicensed frequency band channel access. The channel access procedure may be performed to determine whether the physical sidelink channel (e.g., the radio resources of the sidelink channel) is free to use or is busy (e.g., in use by another wireless communication device such as another UE, an IoT device, a WiFi device, and/or the like). The channel access procedure may include sensing or measuring the physical sidelink channel (e.g., performing an RSRP measurement or another type of signal measurement) during a channel access gap (which may also be referred to as a contention window (CW)) and determining whether the sidelink channel is free or busy based at least in part on the signals sensed or measured on the physical sidelink (e.g., based at least in part on whether the RSRP measurement satisfies a threshold). If the UE determines that the channel access procedure was successful, the UE may perform one or more sidelink transmissions on the sidelink channel during a sidelink transmission opportunity, which may extend for a channel occupancy time (COT).

In some cases, a UE may have periodic sidelink communications to transmit or may have sidelink data to transmit at a later time. However, each subsequent sidelink transmission may be subject to a separate channel access procedure when the subsequent sidelink transmission does not occur within an existing COT. As a result, some sidelink transmissions may be delayed due to potential channel access procedure failures for the sidelink transmissions.

Some aspects described herein provide techniques and apparatuses for multiple transmission opportunity resource reservation for sidelink communication in a shared or unlicensed frequency band such as in an NR unlicensed (NR-U) deployment. In some aspects, a UE may configure SCI to indicate a plurality of sidelink transmission opportunities that are to be reserved for the UE and may transmit the SCI to one or more other UEs. In this way, the SCI may be used to reserve a plurality of sidelink transmission opportunities for new sidelink transmissions and/or sidelink retransmissions, which provides the UE with an increased quantity of opportunities to obtain sidelink channel access to transmit on a sidelink. This increases the likelihood that the UE will obtain sidelink channel access and perform sidelink transmissions on time. Moreover, the capability to signal a reservation of a plurality of sidelink transmission opportunities to other UEs increases the likelihood that the other UEs will honor the reservation by refraining from transmitting during the plurality of sidelink transmission opportunities and the associated channel access procedures.

FIGS. 5A-5H are diagrams illustrating one or more examples 500 associated with multiple transmission opportunity resource reservation for sidelink communication, in accordance with the present disclosure. As shown in FIGS. 5A-5H, example(s) 500 include communication between a plurality of UEs (e.g., UE 120-1 through UE 120-*n*). In some aspects, the UEs may be included in a wireless network, such as wireless network 100. The UEs may communicate on a wireless sidelink in a shared or unlicensed frequency band. In these cases, the UEs may perform a channel access procedure to contend for channel access to the sidelink.

Figure 5A:
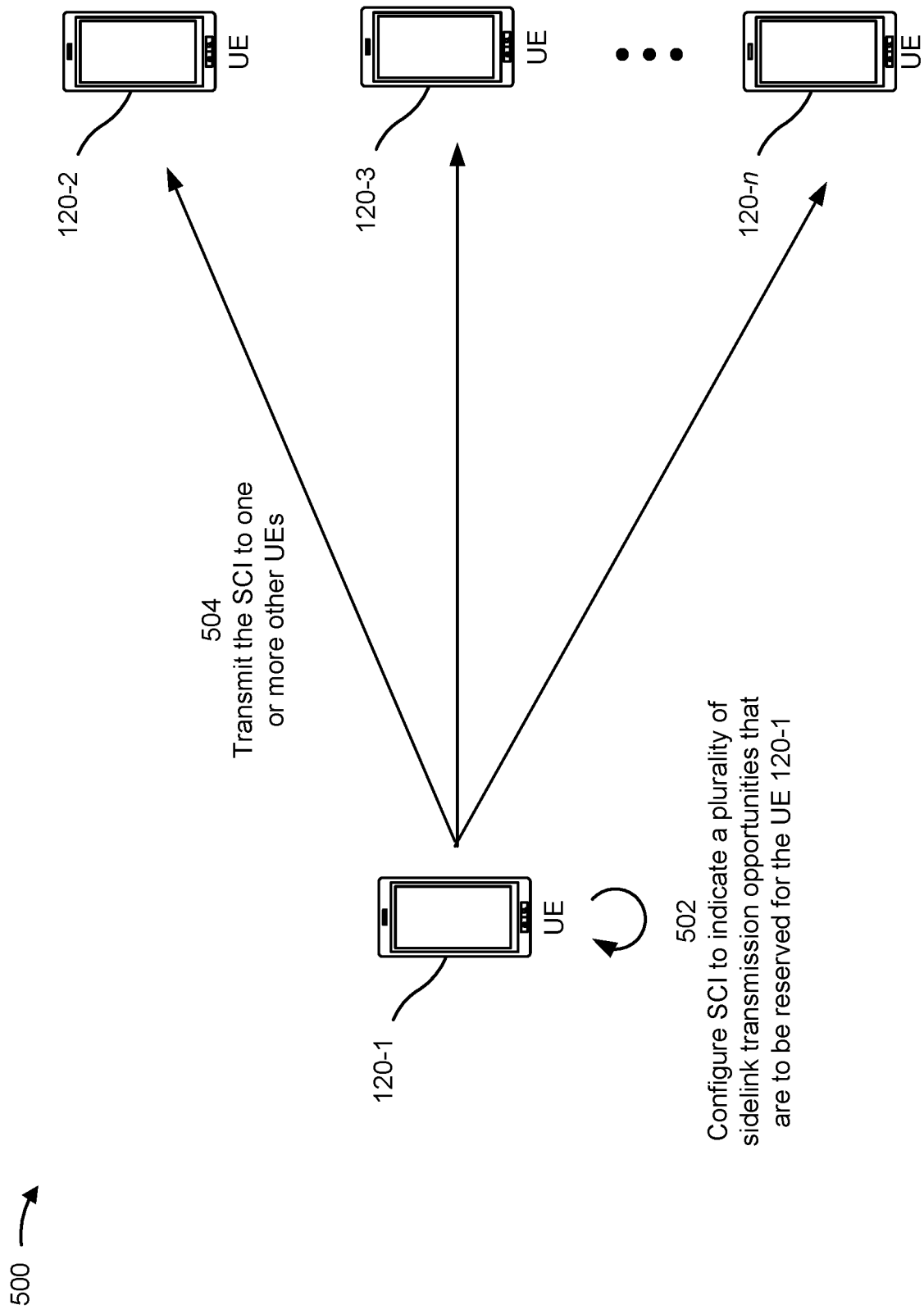
FIGS. 5A-5H are diagrams illustrating examples associated with multiple transmission opportunity resource reservation for sidelink communication, in accordance with the present disclosure.
Figure 8:
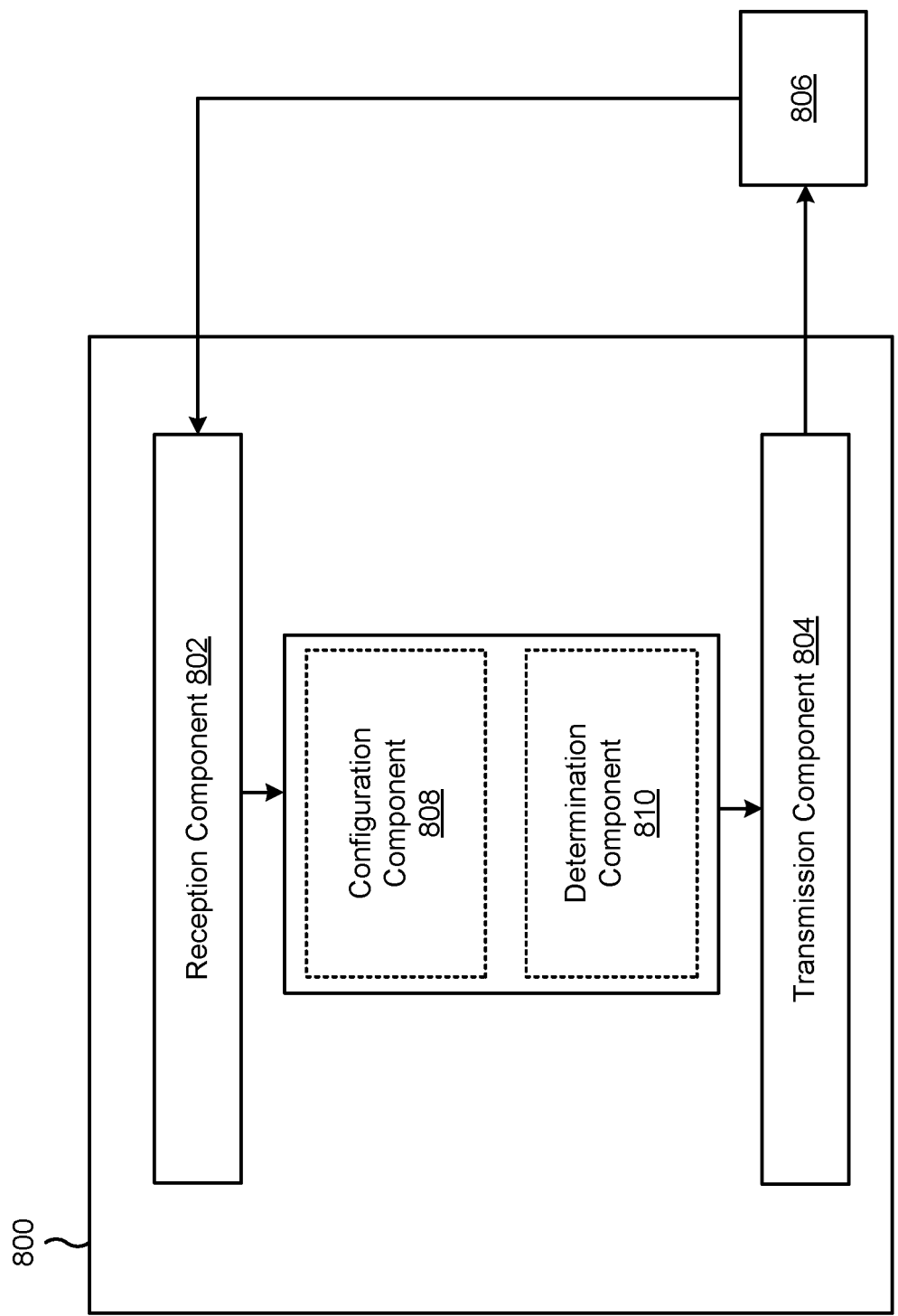
FIG. 8 is a block diagram of an example apparatus for wireless communication, in accordance with the present disclosure.

As shown in FIG. 5A, and by reference number 502, the UE 120-1 may configure (e.g., using receive processor 258, transmit processor 264, controller/processor 280, memory 282, configuration component 808 of FIG. 8, and/or the like) SCI to indicate a plurality of sidelink transmission opportunities that are to be reserved for the UE 120-1. A sidelink transmission opportunity may include one or more radio resources in which a UE 120 may transmit a sidelink communication on a sidelink channel. The radio resources may include time-domain resources (e.g., symbols, slots, subframes, and/or the like) and/or frequency-domain resources (e.g., resource elements, resource blocks, subchannels, subcarriers, and/or the like). Each sidelink transmission opportunity may be used by the UE 120-1 to perform a transmission of a new sidelink communication, a retransmission of a previously transmitted sidelink communication, a repetition of a sidelink communication, and/or the like. In some aspects, the plurality of sidelink transmission opportunities may have the same frequency range (e.g., may have the same starting and ending resource blocks). In some aspects, two or more of the plurality of sidelink transmission opportunities may have different frequency ranges (e.g., may have different starting resource blocks and/or different ending resource blocks). Accordingly, the UE 120-1 may configure the SCI to indicate respective time-domain locations or resources for each of the plurality of sidelink transmission opportunities and/or one or more frequency-domain resources for the plurality of sidelink transmission opportunities.

The UE 120-1 may configure (e.g., using receive processor 258, transmit processor 264, controller/processor 280, memory 282, configuration component 808, and/or the like) an SCI part 1 (SCI-1) component of the SCI and/or an SCI part 2 (SCI-2) component of the SCI to indicate the plurality of sidelink transmission opportunities. The SCI-1 component may include a component of the SCI that is transmitted on a sidelink control channel (e.g., a PSCCH). The SCI-2 component may include a component of the SCI that is transmitted on a sidelink shared channel (e.g., a PSSCH). The SCI-1 component may include control information used for sidelink communications, such as an indication of one or more resources (e.g., time resources, frequency resources, spatial resources, and/or the like) where various types of information may be carried on the PSSCH, information for decoding sidelink communications on the PSSCH, a quality of service (QoS) priority value, a resource reservation period, a PSSCH DMRS pattern, an SCI format and a beta offset for the SCI-2 component, a quantity of PSSCH DMRS ports, an MCS, and/or the like. The SCI-2 component may include various types of information associated with data transmissions on the PSSCH, such as a HARQ process ID, a new data indicator (NDI), a source identifier, a destination identifier, a channel state information (CSI) report trigger, and/or the like.

In some aspects, the UE 120-1 configures or repurposes (e.g., using receive processor 258, transmit processor 264, controller/processor 280, memory 282, configuration component 808, and/or the like) a plurality of existing fields in the SCI to indicate the plurality of sidelink transmission opportunities. The existing fields may be originally configured for indicating periodic sidelink retransmission resources. In these cases, the other UEs (e.g., UE 120-2 through UE 120-n) may reinterpret the values in these existing fields as an indication of the plurality of sidelink time domain resources (e.g., may reinterpret a field indicating an offset value as indicating an offset (e.g., as a time duration or a quantity of time-domain resources) between transmission of the SCI and a time-domain location of a first sidelink transmission opportunity of the plurality of sidelink transmission opportunities, may reinterpret a field indicating time-domain locations for retransmissions relative to the offset as indicating respective time-domain locations for each of the plurality of sidelink transmission opportunities relative to the offset).

In some aspects, the UE 120-1 configures (e.g., using receive processor 258, transmit processor 264, controller/ processor 280, memory 282, configuration component 808, and/or the like) the SCI to include new and/or additional fields that are specifically for (or dedicated to) indicating the plurality of sidelink transmission opportunities. In this way, the UE 120-1 may use the SCI to indicate the plurality of sidelink transmission opportunities in addition to indicating periodic sidelink retransmission resources. The new and/or additional fields may include an offset field that indicates an offset (e.g., as a time duration or a quantity of time-domain resources) between transmission of the SCI and a time-domain location of a first sidelink transmission opportunity of the plurality of sidelink transmission opportunities, may include a plurality of fields indicating respective time-domain locations for each of the plurality of sidelink transmission opportunities relative to the offset, may include a field indicating a quantity of sidelink transmission opportunities of the plurality of sidelink transmission opportunities, may include one or more fields indicating one or more frequency-domain resources for the plurality of sidelink transmission opportunities, and/or may include other fields for indicating the plurality of sidelink transmission opportunities. In this way, the other UEs (e.g., UE 120-2 through UE 120-n) may identify the plurality of sidelink transmissions based at least in part on the information included in the new and/or additional fields.

In some aspects, the UE 120-1 configures (e.g., using receive processor 258, transmit processor 264, controller/ processor 280, memory 282, configuration component 808, and/or the like) the SCI to further indicate information associated with a channel access gap size for the plurality of sidelink transmission opportunities. The channel access gap size may be a time duration (e.g., in milliseconds, seconds and/or the like) or a time-domain resource duration (e.g., a quantity of symbols, a quantity of slots, and/or the like) in which the UE 120-1 is to perform a channel access procedure for an associated sidelink transmission opportunity. The information associated with the channel access gap size may include a sidelink channel access priority class (CAPC) associated with the UE 120-1 for the plurality of sidelink transmission opportunities, an explicit indication of the channel access gap size (e.g., as a time duration or a quantity of time-domain resources), a codeword size for the plurality of sidelink transmission opportunities, and/or other types of information that may permit the other UEs (e.g., UE 120-2 through UE 120-n) to determine the channel access gap size for the plurality of sidelink transmission opportunities. In some aspects, the UE 120-1 configures the SCI to indicate the information associated with the channel access gap size in an SCI-1 component of the SCI. In some aspects, the UE 120-1 configures the SCI to indicate the information associated with the channel access gap size in an SCI-2 component of the SCI.

As further shown in FIG. 5A, and by reference number 504, the UE 120-1 may transmit (e.g., using controller/ processor 280, transmit processor 264, TX MIMO processor 266, MOD 254, antenna 252, memory 282, transmission component 804 of FIG. 8, and/or the like) the SCI to one or more other UEs (e.g., one or more of UE 120-2 through UE 120-n). The UE 120-1 may transmit (e.g., using controller/ processor 280, transmit processor 264, TX MIMO processor 266, MOD 254, antenna 252, memory 282, transmission component and/or the like) the SCI on one or more sidelink channels such as a PSCCH and/or a PSSCH. The one or more other UEs (e.g., one or more of UE 120-2 through UE 120-n) may receive (e.g., using antenna 252, DEMOD 254, MIMO detector 256, receive processor 258, controller/ processor 280, memory 282, reception component 802 of FIG. 8, and/or the like) the SCI from the UE 120-1.

Figure 5B:
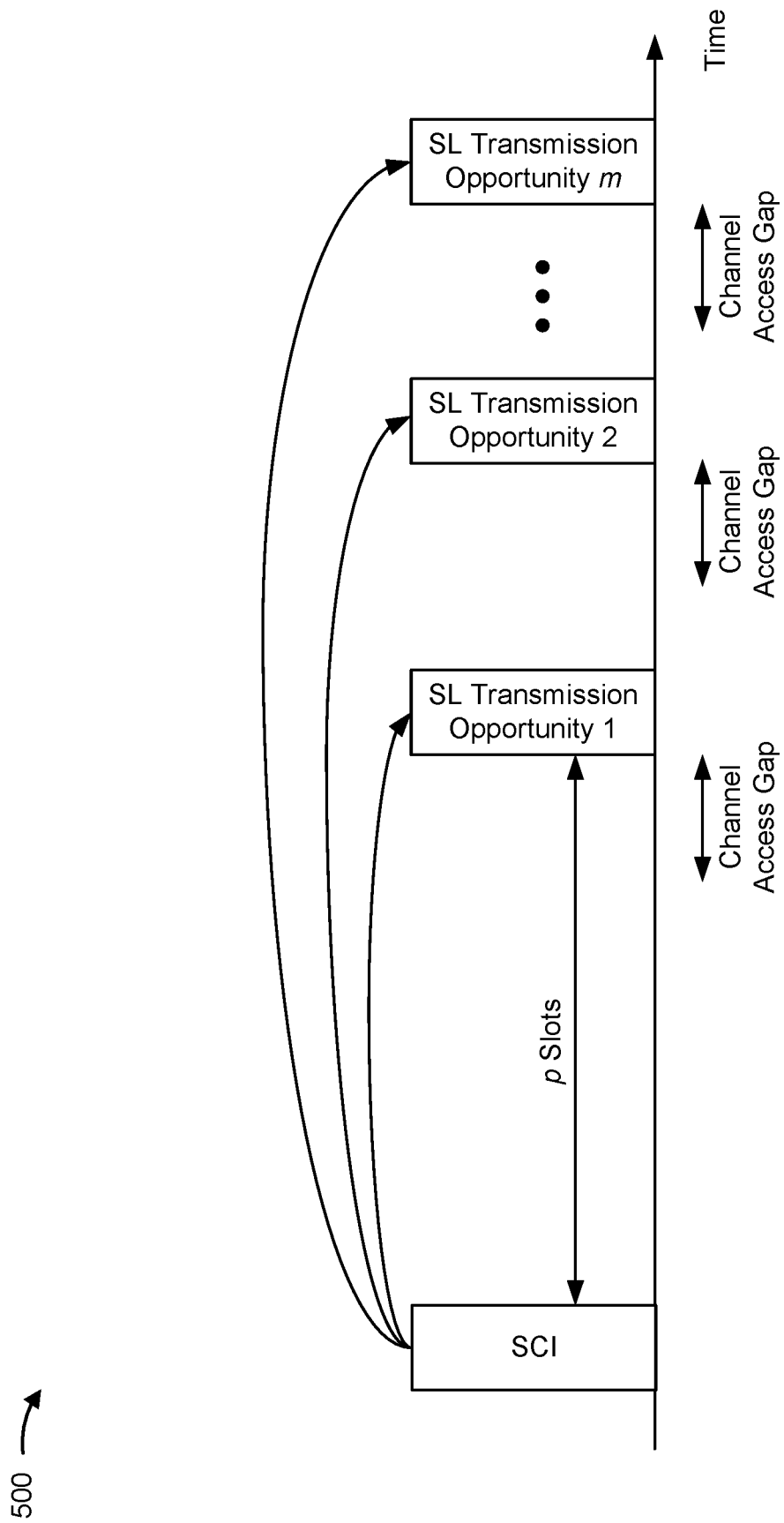

As shown in FIG. 5B, the SCI may indicate a plurality of sidelink transmission opportunities, such as sidelink (SL) transmission opportunity 1 through SL transmission opportunity m. As further shown in FIG. 5B, each sidelink transmission opportunity may have a corresponding channel access gap prior to the sidelink transmission opportunity in which the UE 120-1 is to perform a channel access procedure for the sidelink transmission opportunity. As indicated above, in some aspects, the SCI may indicate an offset of p slots or other time-domain resources between the ending time-domain resource of the SCI transmission and the starting resources of the first sidelink transmission opportunity (e.g., SL transmission opportunity 1).

Figure 5C:
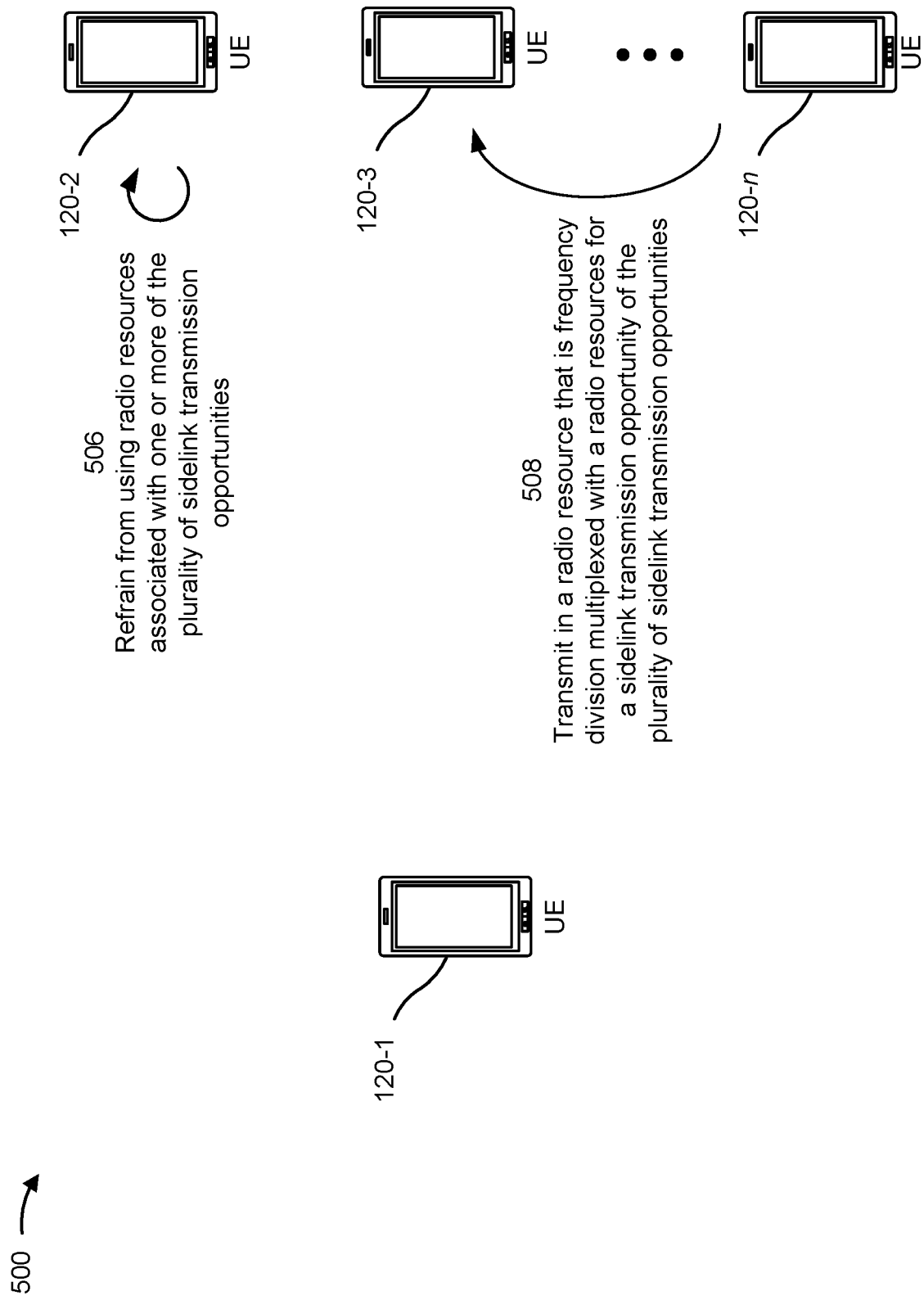

As shown in FIG. 5C, and by reference number 506, one or more of the other UEs (e.g., the UE 120-2 through UE 120-*n*) may refrain from (e.g., using controller/processor 280, transmit processor 264, TX MIMO processor 266, MOD 254, antenna 252, memory 282, transmission component 804, and/or the like) using the radio resources associated with one or more of the plurality of sidelink transmission opportunities. In particular, the UE 120-2 may refrain from using the time-domain resources or locations and/or the frequency-domain resources of the one or more sidelink transmission opportunities. Moreover, the UE 120-2 may refrain from (e.g., using controller/processor 280, transmit processor 264, TX MIMO processor 266, MOD 254, antenna 252, memory 282, transmission component 804, and/or the like) using at least a subset of the radio resources associated with the corresponding channel access gap(s) (e.g., for the duration of the channel gap size of the corresponding channel access gap(s)). The other UEs refraining from using the resources associated with the one or more sidelink transmission opportunities and the corresponding channel access gaps may increase the likelihood that the channel access procedure for at least one of the sidelink transmission opportunities is successful, so that the UE 120-1 may obtain a COT on the sidelink.

As further shown in FIG. 5C, and by reference number 508, one or more of the other UEs, such as UE 120-*n*, may transmit (e.g., using controller/processor 280, transmit processor 264, TX MIMO processor 266, MOD 254, antenna 252, memory 282, transmission component 804, and/or the like) a sidelink communication in a radio resource that is frequency division multiplexed with a sidelink transmission opportunity of the plurality of sidelink transmission opportunities. In these cases, the UE 120-*n* may transmit the sidelink communication in one or more frequency-domain resources that are frequency division multiplexed with the sidelink transmission opportunity and in one or more time-domain resources that at least partially overlap with the time-domain resources of the sidelink transmission opportunity. In this way, the UE 120-*n* may use the same time-domain resource(s) as the UE 120-1 to transmit on the sidelink, while still honoring the reservation of the sidelink transmission opportunity by transmitting in frequency-domain resource(s) that do not non-overlap the frequency-domain resources of the sidelink transmission opportunity.

Figure 5D:
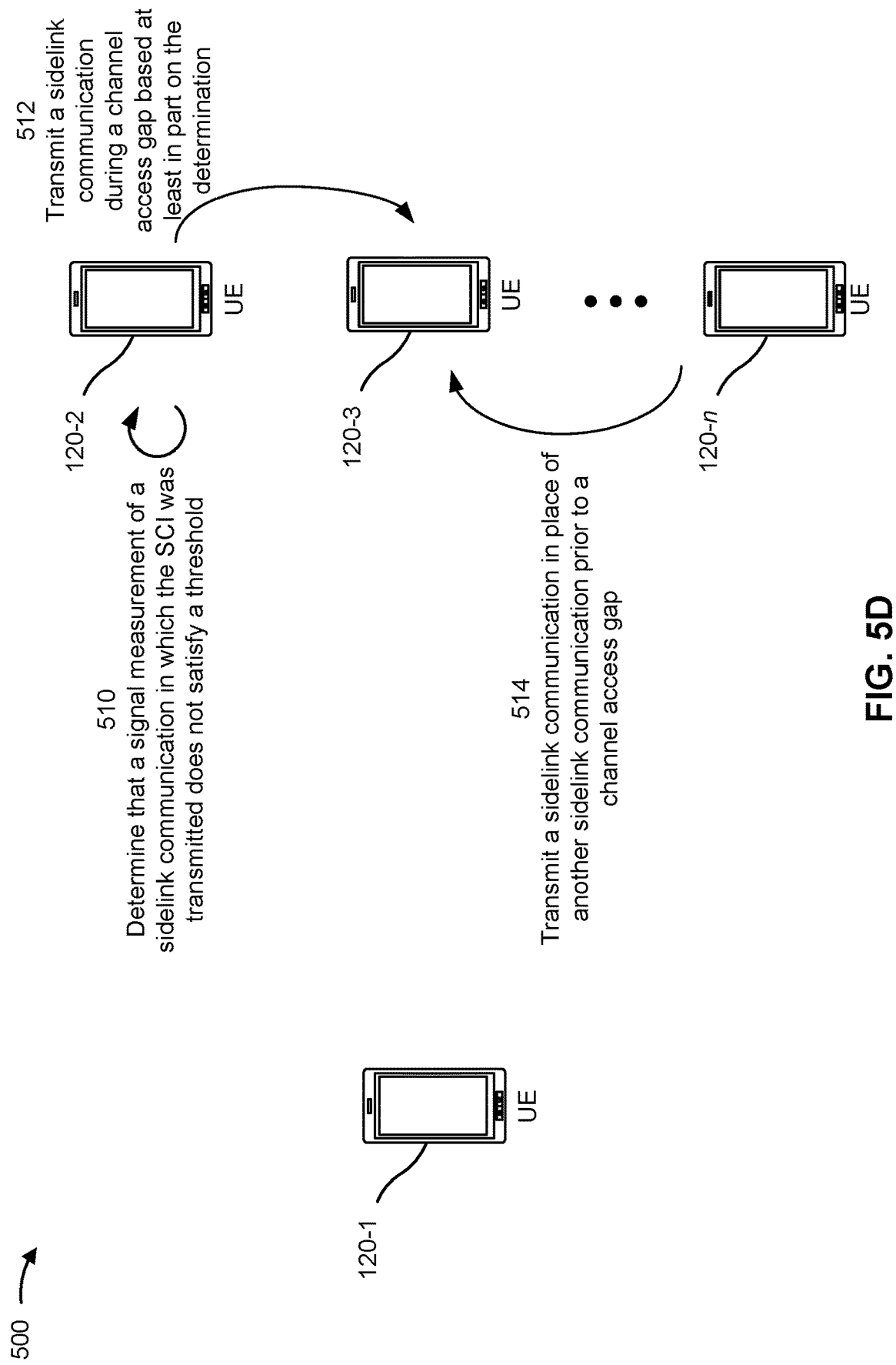

As shown in FIG. 5D, and by reference numbers 510 and 512, one or more of the other UEs, such as the UE 120-2, may determine (e.g., using receive processor 258, transmit processor 264, controller/processor 280, memory 282, determination component 810 of FIG. 8, and/or the like) that a signal measurement of a sidelink communication in which the SCI was transmitted does not satisfy a threshold, and may transmit (e.g., using controller/processor 280, transmit processor 264, TX MIMO processor 266, MOD 254, antenna 252, memory 282, transmission component 804, and/or the like) a sidelink communication during a channel access gap (or a plurality of channel access gaps) associated with a sidelink transmission opportunity based at least in part on the determination. In some cases, the UE 120-2 may be located far enough from the UE 120-1 (and/or the signal path between the UE 120-1 and the UE 120-2 may be partially attenuated) such that transmissions by the UE 120-2 might not cause a channel access procedure of the UE 120-1 to fail. Accordingly, the threshold may be configured such that transmissions by the UE 120-2 are unlikely to cause a channel access procedure of the UE 120-1 to fail if a signal measurement of the sidelink communication in which the SCI is transmitted does not satisfy the threshold. The signal measurement may be an RSRP measurement, an RSSI measurement, or another type of signal strength measurement. In some aspects, the threshold may be open loop control based if the transmit power of the UE 120-1 is approximately known to the UE 120-2.

As further shown in FIG. 5D, and by reference number 514, one or more of the other UEs, such as the UE 120-*n*, may transmit (e.g., using controller/processor 280, transmit processor 264, TX MIMO processor 266, MOD 254, antenna 252, memory 282, transmission component 804, and/or the like) a sidelink communication in place of another sidelink communication prior to a channel access gap associated with a sidelink transmission opportunity of the plurality of sidelink transmission opportunities. In some aspects, the UE 120-*n* may determine (e.g., using receive processor 258, transmit processor 264, controller/processor 280, memory 282, determination component 810, and/or the like), based at least in part on a channel access gap size for the channel access gap, that the other sidelink communication (e.g., a PSSCH communication, a PSCCH communication, or another type of sidelink communication) is to be transmitted at least partially during the channel access gap.

The UE 120-*n* may determine (e.g., using receive processor 258, transmit processor 264, controller/processor 280, memory 282, determination component 810, and/or the like) to transmit the sidelink communication in place of the other sidelink communication based at least in part on determining that transmission of the sidelink communication will not overlap with the channel access gap. This may occur in cases where the other sidelink communication is a longer transmission duration than the sidelink communication (or where the sidelink communication is a shorter transmission duration than the other sidelink communication). The UE 120-*n* may determine (e.g., using receive processor 258, transmit processor 264, controller/processor 280, memory 282, determination component 810, and/or the like) that the sidelink communication is a shorter transmission duration than the other sidelink communication, based at least in part on an indication of the respective time durations for the sidelink communication and the other sidelink communication. The indication of the respective time durations may be included in the SCI received from the UE 120-1 (e.g., an SCI-1 component or an SCI-2 component), may be included in other SCI received from the UE 120-1 or another UE or base station, and/or the like. In this way, the UE 120-*n* may transmit (e.g., using controller/processor 280, transmit processor 264, TX MIMO processor 266, MOD 254, antenna 252, memory 282, transmission component 804, and/or the like) the shorter sidelink communication in place of the longer sidelink communication, such that the shorter sidelink communication may be transmitted prior to the channel access gap (e.g., such that the transmission of the shorter sidelink communication does not overlap with the channel access gap).

Figure 5E:
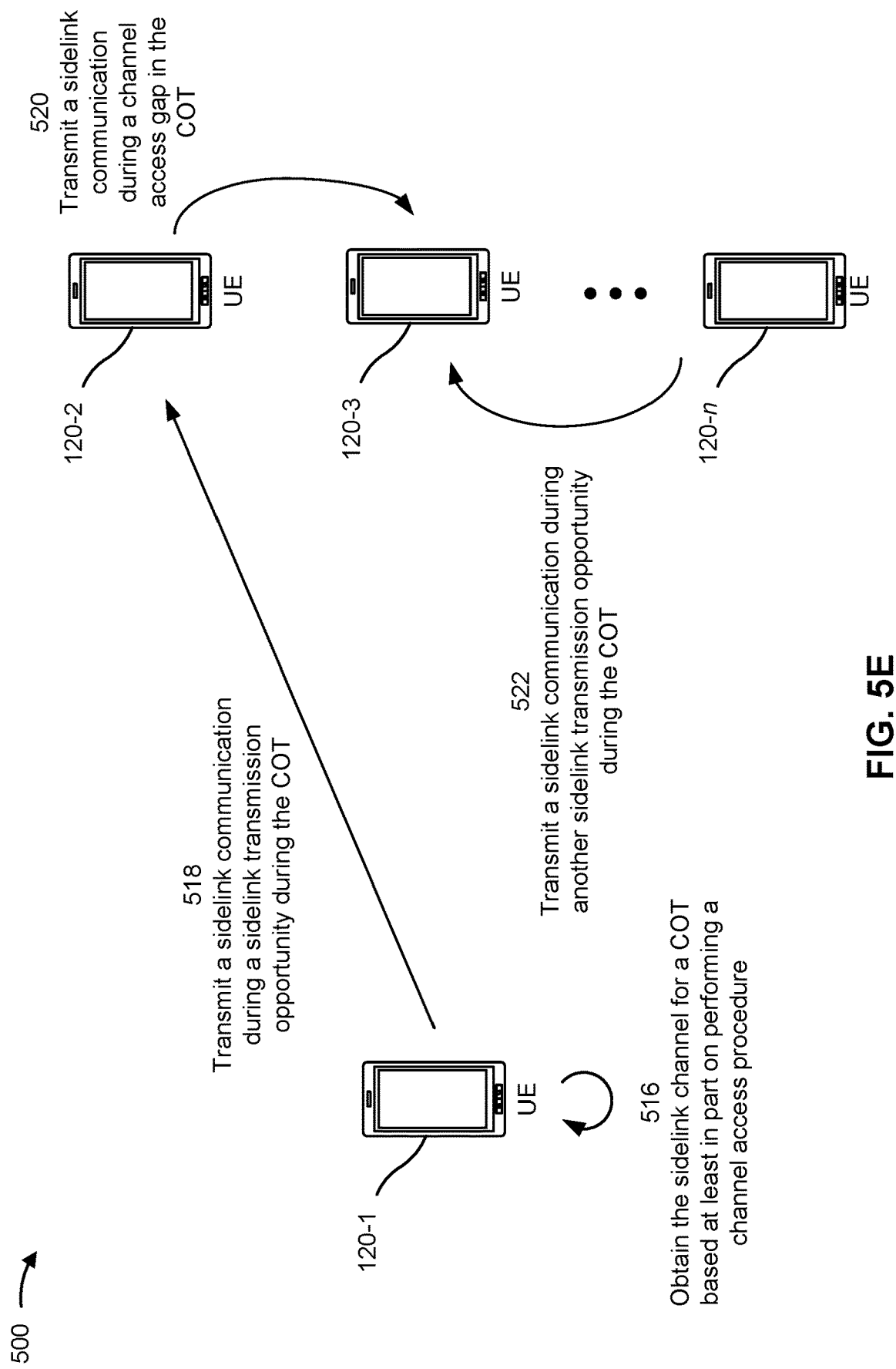

As shown in FIG. 5E, and by reference number 516, the UE 120-1 may obtain the sidelink channel for a COT based at least in part on performing (e.g., using antenna 252, DEMOD 254, MIMO detector 256, receive processor 258, controller/processor 280, memory 282, reception component 802, determination component 810, and/or the like) a channel access procedure. In some aspects, the UE 120-1 may perform the channel access procedure during a channel access gap associated with a sidelink transmission opportunity of the plurality of sidelink transmission opportunities. In some aspects, the UE 120-1 may perform an early channel access procedure (e.g., may start the channel access procedure prior to a channel access gap).

As further shown in FIG. 5E, and by reference number 518, the UE 120-1 may transmit (e.g., using controller/processor 280, transmit processor 264, TX MIMO processor 266, MOD 254, antenna 252, memory 282, transmission component 804, and/or the like) a sidelink communication during a sidelink transmission opportunity during the COT (e.g., to UE 120-2 or another UE). In some aspects, the channel access gap associated with the sidelink transmission opportunity may be canceled if the UE 120-1 acquires the sidelink channel prior to the channel access gap. In these cases, other UEs may transmit (e.g., using controller/processor 280, transmit processor 264, TX MIMO processor 266, MOD 254, antenna 252, memory 282, transmission component 804, and/or the like) during the canceled channel access gap. The UE 120-1 may also transmit, in the sidelink transmission opportunity or prior to the sidelink transmission opportunity, SCI (e.g., an SCI-2 component) identifying the COT (e.g., the starting time-domain resource and/or the ending time-domain resources of the COT) to the other UEs (e.g., UE 120-2 through UE 120-*n*).

As further shown in FIG. 5E, and by reference number 520, one or more other UEs, such as UE 120-2, may transmit (e.g., using controller/processor 280, transmit processor 264, TX MIMO processor 266, MOD 254, antenna 252, memory 282, transmission component 804, and/or the like) a sidelink communication during a channel access gap in the COT. In these cases, the UE 120-2 may determine (e.g., using receive processor 258, transmit processor 264, controller/processor 280, memory 282, determination component 810, and/or the like) that the UE 120-1 was able to use the sidelink transmission opportunity and, thus, the remaining sidelink transmission opportunities during the COT are no longer needed. Accordingly, the UE 120-2 may transmit the sidelink communication during a channel access gap subsequent to the sidelink transmission opportunity based at least in part on the determination. The UE 120-2 may determine (e.g., using receive processor 258, transmit processor 264, controller/processor 280, memory 282, determination component 810, and/or the like) the sidelink transmission opportunities and corresponding channel access gaps remaining in the COT based at least in part on receiving (e.g., using antenna 252, DEMOD 254, MIMO detector 256, receive processor 258, controller/processor 280, memory 282, reception component 802, and/or the like) the SCI identifying the COT from the UE 120-1.

As further shown in FIG. 5E, and by reference number 522, one or more other UEs, such as UE 120-*n*, may transmit (e.g., using controller/processor 280, transmit processor 264, TX MIMO processor 266, MOD 254, antenna 252, memory 282, transmission component 804, and/or the like) a sidelink communication during a sidelink transmission opportunity in the COT subsequent to the sidelink transmission opportunity in which the UE 120-1 transmitted the sidelink communication. In these cases, the UE 120-*n* may determine (e.g., using receive processor 258, transmit processor 264, controller/processor 280, memory 282, determination component 810, and/or the like) that the UE 120-1 was able to use the sidelink transmission opportunity and, thus, the remaining sidelink transmission opportunities during the COT are no longer needed. Accordingly, the UE 120-*n* may transmit the sidelink communication during the subsequent sidelink transmission opportunity based at least in part on the determination. The UE 120-*n* may determine (e.g., using receive processor 258, transmit processor 264, controller/processor 280, memory 282, determination component 810, and/or the like) the sidelink transmission opportunities and corresponding channel access gaps remaining in the COT based at least in part on receiving (e.g., using antenna 252, DEMOD 254, MIMO detector 256, receive processor 258, controller/processor 280, memory 282, reception component 802, and/or the like) the SCI identifying the COT from the UE 120-1.

Figure 5F:
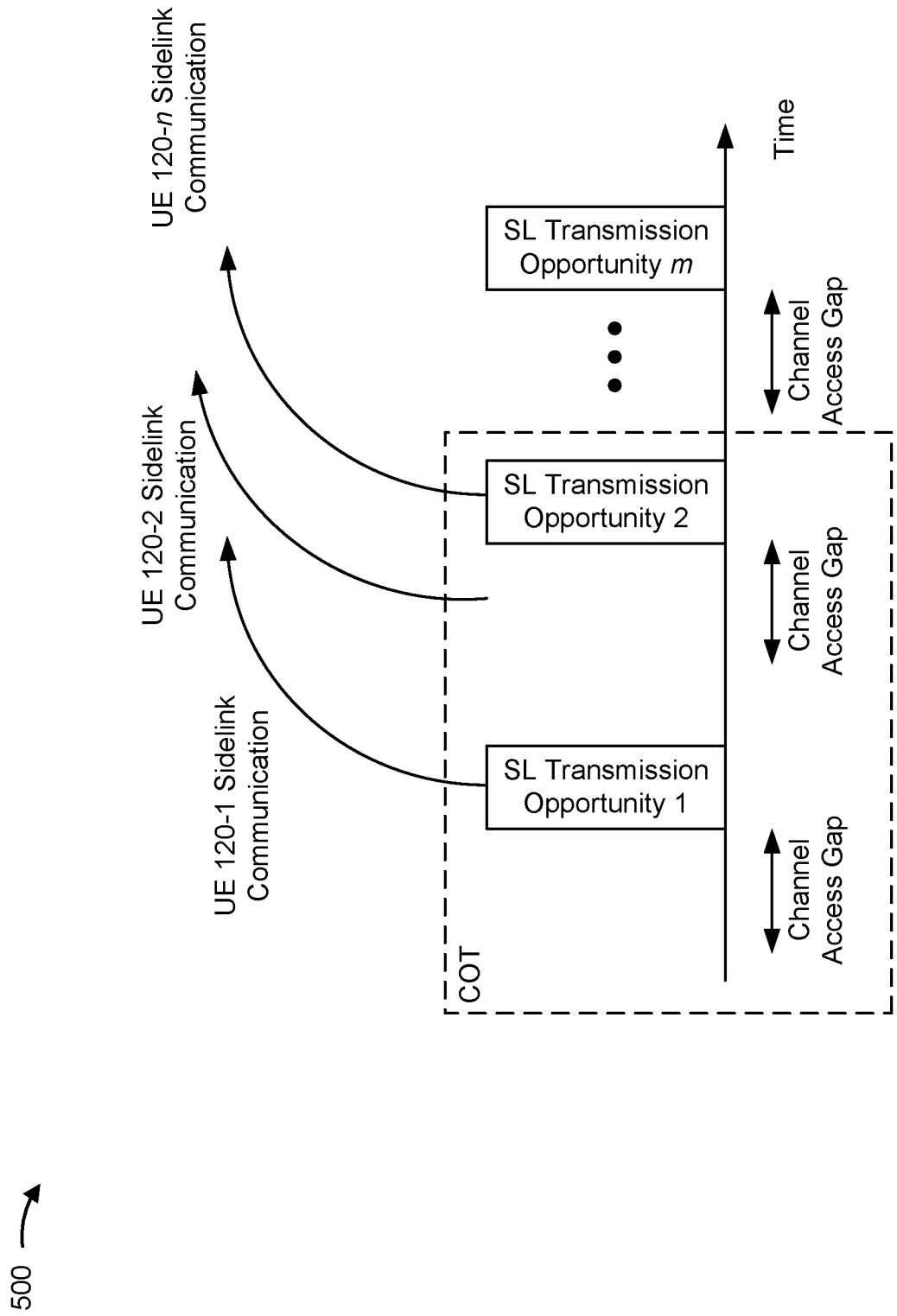

As shown in FIG. 5F, the sidelink communication of the UE 120-1 (e.g., at reference number 518 in FIG. 5E) may be transmitted in the SL transmission opportunity 1 in the COT. As further shown in FIG. 5F, the sidelink communication of the UE 120-2 may be transmitted during the channel access gap of the SL transmission opportunity 2 subsequent to the SL transmission opportunity 1 in the COT. As further shown in FIG. 5F, the sidelink communication of the UE 120-*n* may be transmitted during the SL transmission opportunity 2 subsequent to the SL transmission opportunity 1 in the COT.

Figure 5G:
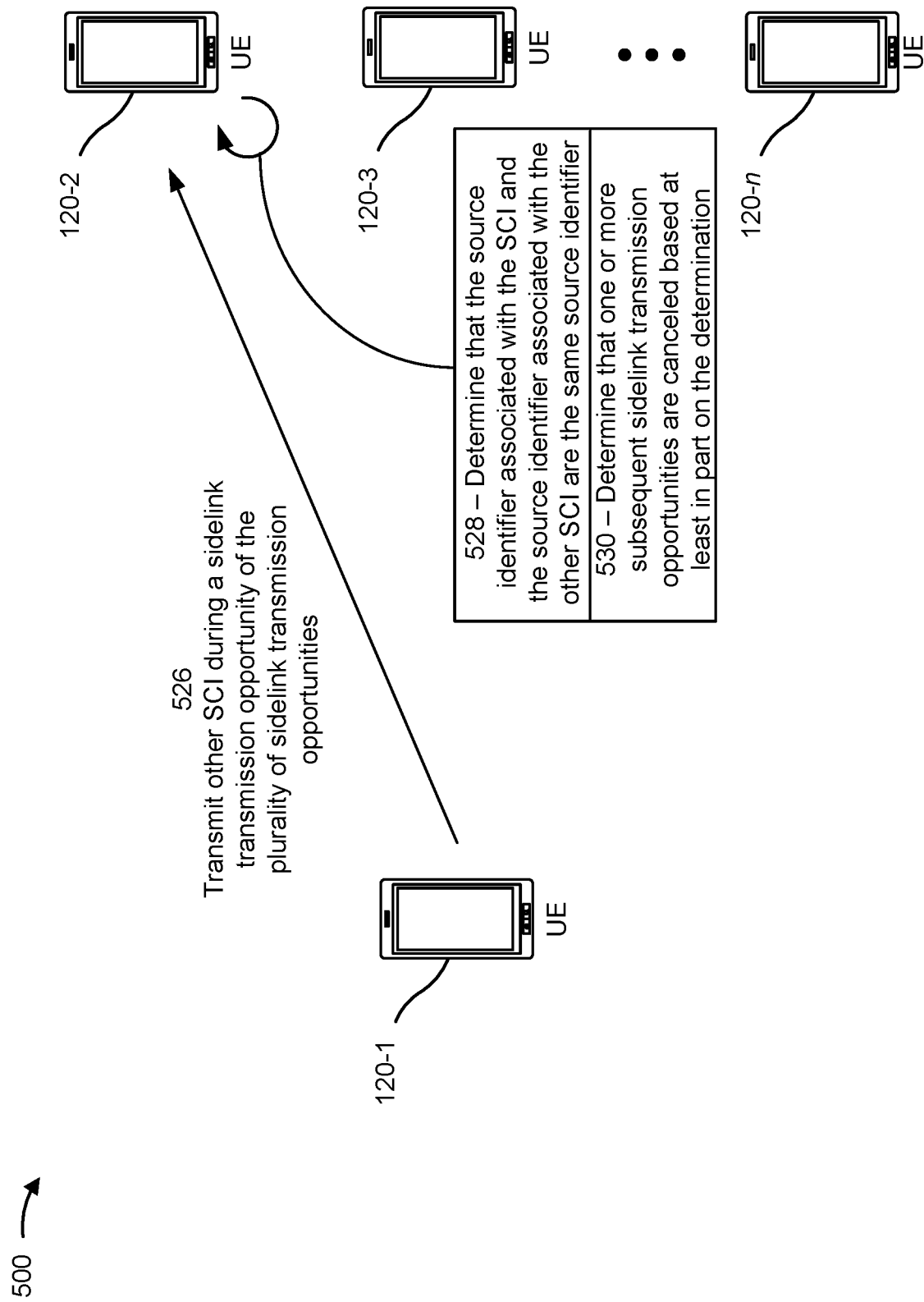

As shown in FIG. 5G, and by reference number 526, the UE 120-1 may transmit (e.g., using controller/processor 280, transmit processor 264, TX MIMO processor 266, MOD 254, antenna 252, memory 282, transmission component 804, and/or the like) other SCI during a sidelink transmission opportunity of the plurality of sidelink transmission opportunities. The transmission of the other SCI during the sidelink transmission opportunities may implicitly indicate to the other UEs that the UE 120-1 was able to obtain the sidelink channel and transmit in the sidelink transmission opportunity, and thus, the UE 120-1 no longer needs the remaining sidelink transmission opportunities in the plurality of sidelink transmission opportunities. In these cases, the other UEs may assume that the remaining sidelink transmission opportunities are implicitly canceled. This frees up the remaining sidelink transmission opportunities to be used by the other UEs, which increases the usage efficiency of these remaining sidelink transmission opportunities. If no SCI is detected during a sidelink transmission opportunity, the other UEs may assume that the UE 120-1 was unable to obtain the sidelink channel for the sidelink transmission opportunity and the UE 120-1 will try to obtain the sidelink channel for the next sidelink transmission opportunity.

As further shown in FIG. 5G, and by reference number 528, one or more of the other UEs, such as UE 120-2, may determine (e.g., using receive processor 258, transmit processor 264, controller/processor 280, memory 282, determination component 810, and/or the like) that the source identifier associated with the SCI (e.g., which may be indicated in an SCI-1 component or an SCI-2 component of the SCI) transmitted as indicated by reference number 504, and a source identifier associated with the other SCI (e.g., which may be indicated in an SCI-1 component or an SCI-2 component of the other SCI), are the same source identifier (e.g., the source identifier associated with the UE 120-1). As shown by reference number 530, the UE 120-2 may determine (e.g., using receive processor 258, transmit processor 264, controller/processor 280, memory 282, determination component 810, and/or the like) that one or more sidelink transmission opportunities subsequent to the transmission opportunity in which the UE 120-1 transmitted the other SCI are implicitly canceled, based at least in part on determining that the source identifier associated with the SCI and the source identifier associated with the other SCI are the same source identifier.

Figure 5H:
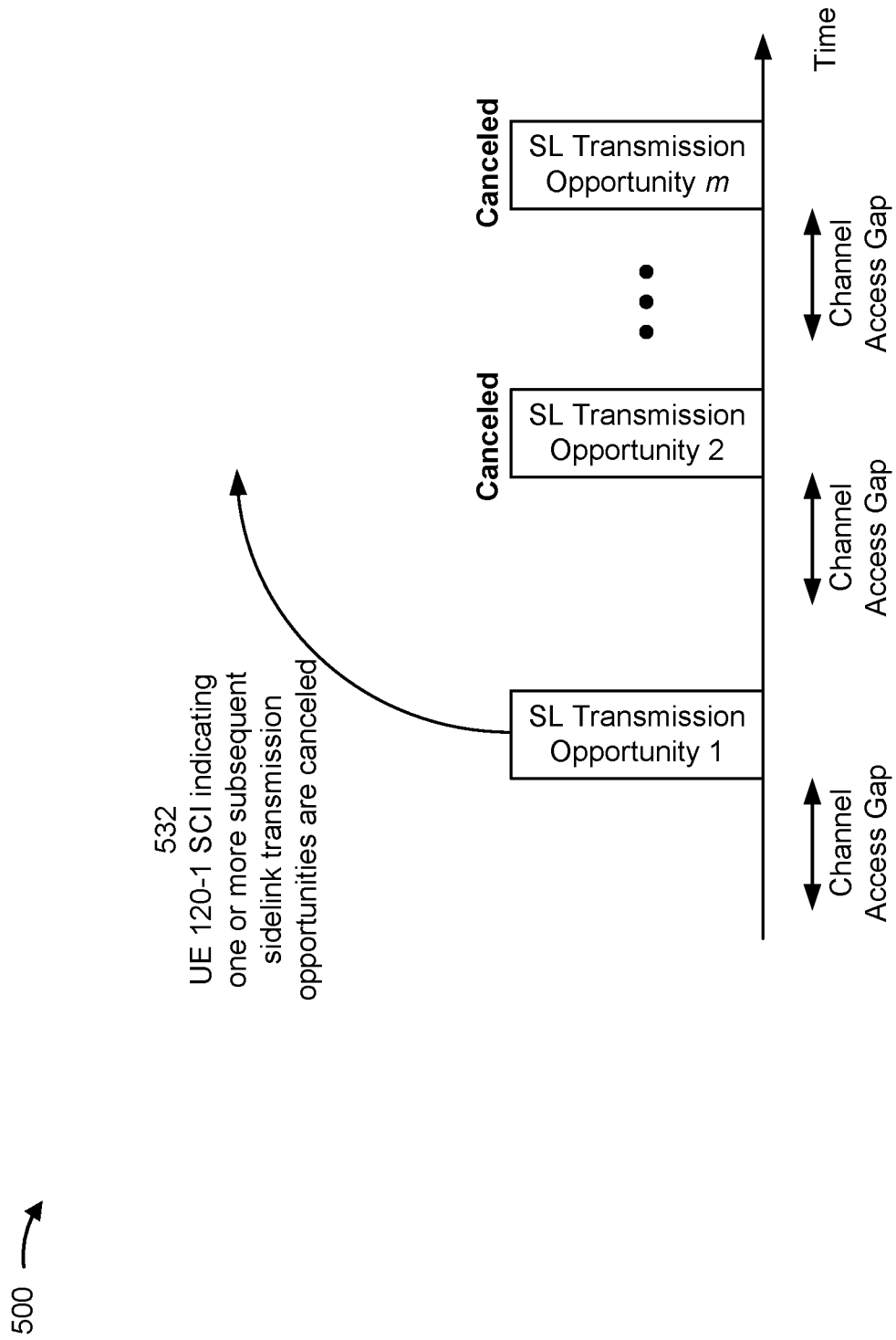

As shown in FIG. 5H, and by reference number 532, the UE 120-1 may configure (e.g., using receive processor 258, transmit processor 264, controller/processor 280, memory 282, configuration component 808, and/or the like) SCI transmitted during the sidelink transmission opportunity to explicitly indicate that one or more subsequent sidelink transmission opportunities of the plurality of sidelink transmission opportunities are canceled. The UE 120-1 may configure (e.g., using receive processor 258, transmit processor 264, controller/processor 280, memory 282, configuration component 808, and/or the like) the SCI-1 component and/or the SCI-2 component to include the explicit indication. In these cases, the one or more other UEs may transmit on the sidelink channel during the canceled sidelink transmission opportunities and/or the corresponding channel access gaps.

In some aspects, the UE 120-1 may configure (e.g., using receive processor 258, transmit processor 264, controller/processor 280, memory 282, configuration component 808, and/or the like) the SCI (e.g., the SCI-1 component and/or the SCI-2 component) to indicate the one or more subsequent transmission opportunities as being associated with the source identifier of the UE 120-1, to indicate a time range in which all sidelink transmission opportunities associated with the source identifier of the UE 120-1 are canceled, and/or the like. In some aspects, the UE 120-1 may configure (e.g., using receive processor 258, transmit processor 264, controller/processor 280, memory 282, configuration component 808, and/or the like) the SCI (e.g., the SCI-1 component and/or the SCI-2 component) to indicate that one or more subsequent transmission opportunities are canceled for particular UEs of the other UEs 120-2 through UE 120-n. In these cases, the UE 120-1 may configure (e.g., using receive processor 258, transmit processor 264, controller/processor 280, memory 282, configuration component 808, and/or the like) the SCI (e.g., the SCI-1 component and/or the SCI-2 component) to indicate that one or more subsequent transmission opportunities are canceled for a particular destination identifier (or destination identifiers) associated with the one or more other UEs.

In this way, a UE may configure SCI to indicate a plurality of sidelink transmission opportunities that are to be reserved for the UE and may transmit the SCI to one or more other UEs. The SCI may be used to reserve a plurality of sidelink transmission opportunities for new sidelink transmissions and/or sidelink retransmissions, which provides the UE with an increased quantity of opportunities to obtain sidelink channel access to transmit on a sidelink. This increases the likelihood that the UE will obtain sidelink channel access. Moreover, the capability to signal a reservation of a plurality of sidelink transmission opportunities to other UEs increases the likelihood that the other UEs will honor the reservation by refraining from transmitting during the plurality of sidelink transmission opportunities and the associated channel access procedures.

As indicated above, FIGS. 5A-5H are provided as one or more examples. Other examples may differ from what is described with respect to FIGS. 5A-5H.

Figure 6:
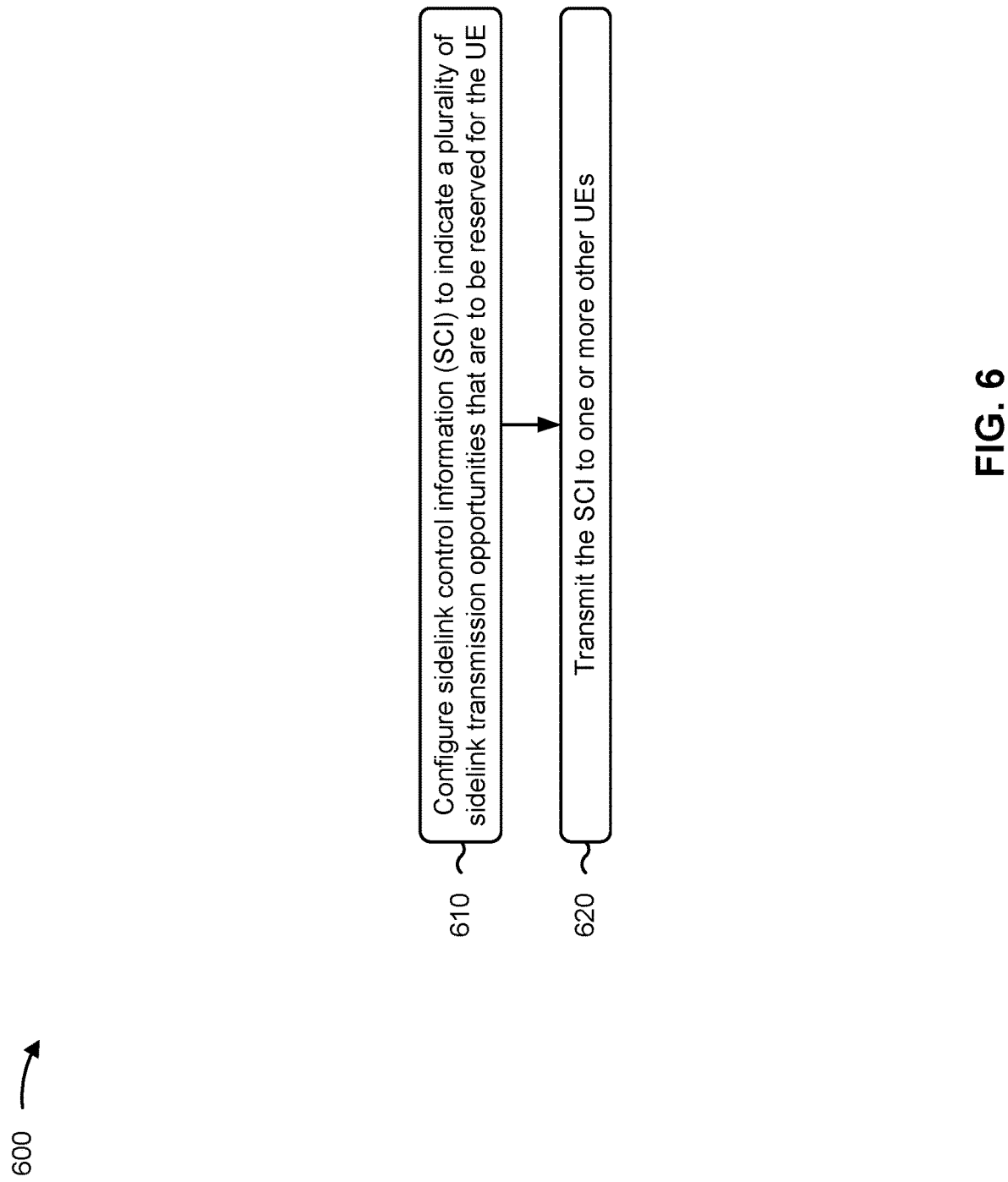
FIGS. 6 and 7 are diagrams illustrating example processes associated with multiple transmission opportunity resource reservation for sidelink communication, in accordance with the present disclosure.

FIG. 6 is a diagram illustrating an example process 600 performed, for example, by a UE, in accordance with the present disclosure. Example process 600 is an example where the UE (e.g., UE 120) performs operations associated with multiple transmission opportunity resource reservation for sidelink communication.

As shown in FIG. 6, in some aspects, process 600 may include configuring SCI to indicate a plurality of sidelink transmission opportunities that are to be reserved for the UE (block 610). For example, the UE (e.g., using antenna 252, demodulator 254, MIMO detector 256, receive processor 258, transmit processor 264, TX MIMO processor 266, modulator 254, controller/processor 280, memory 282, and/or configuration component 808) may configure SCI to indicate a plurality of sidelink transmission opportunities that are to be reserved for the UE, as described above.

As further shown in FIG. 6, in some aspects, process 600 may include transmitting the SCI to one or more other UEs (block 620). For example, the UE (e.g., using antenna 252, demodulator 254, MIMO detector 256, receive processor 258, transmit processor 264, TX MIMO processor 266, modulator 254, controller/processor 280, memory 282, and/or transmission component 804) may transmit the SCI to one or more other UEs, as described above.

Process 600 may include additional aspects, such as any single aspect or any combination of aspects described below and/or in connection with one or more other processes described elsewhere herein.

In a first aspect, configuring the SCI to indicate the plurality of sidelink transmission opportunities comprises configuring an SCI-1 component of the SCI to indicate the plurality of sidelink transmission opportunities. In a second aspect, alone or in combination with the first aspect, the SCI indicates at least one of respective time-domain locations for each of the plurality of sidelink transmission opportunities, or one or more frequency-domain resources for the plurality of sidelink transmission opportunities. In a third aspect, alone or in combination with one or more of the first and second aspects, the SCI includes a plurality of existing fields that are repurposed to indicate an offset between transmission of the SCI and a time-domain location of a first sidelink transmission opportunity of the plurality of sidelink transmission opportunities, and respective time-domain locations for each of the plurality of sidelink transmission opportunities relative to the offset.

In a fourth aspect, alone or in combination with one or more of the first through third aspects, the SCI includes a plurality of new fields indicating at least one of an offset between transmission of the SCI and a time-domain location of a first sidelink transmission opportunity of the plurality of sidelink transmission opportunities, respective time-domain locations for each of the plurality of sidelink transmission opportunities relative to the offset, a quantity of the plurality of sidelink transmission opportunities, or one or more frequency-domain resources for the plurality of sidelink transmission opportunities. In a fifth aspect, alone or in combination with one or more of the first through fourth aspects, process 600 includes configuring (e.g., using receive processor 258, transmit processor 264, controller/processor 280, memory 282, and/or configuration component 808) the SCI to indicate information associated with a channel access gap size for the plurality of sidelink transmission opportunities.

In a sixth aspect, alone or in combination with one or more of the first through fifth aspects, the information associated with the channel access gap size comprises at least one of a sidelink CAPC for the plurality of sidelink transmission opportunities, an explicit indication of the channel access gap size as a time duration, an explicit indication of the channel access gap size as a quantity of time-domain resources, or a codeword size for the plurality of sidelink transmission opportunities. In a seventh aspect, alone or in combination with one or more of the first through sixth aspects, process 600 includes transmitting (e.g., using controller/processor 280, transmit processor 264, TX MIMO processor 266, MOD 254, antenna 252, memory 282, and/or transmission component 804), in a sidelink transmission opportunity of the plurality of sidelink transmission opportunities, additional SCI indicating that one or more subsequent sidelink transmission opportunities are canceled.

In an eighth aspect, alone or in combination with one or more of the first through seventh aspects, process 600 includes configuring (e.g., using receive processor 258, transmit processor 264, controller/processor 280, memory 282, and/or configuration component 808) an SCI-2 component of the additional SCI to indicate that the one or more subsequent sidelink transmission opportunities are canceled. In a ninth aspect, alone or in combination with one or more of the first through eighth aspects, the one or more subsequent sidelink transmission opportunities are indicated in the SCI as being associated with at least one of a source identifier associated with the UE, or a destination identifier associated with a second UE of the one or more UEs.

In a tenth aspect, alone or in combination with one or more of the first through ninth aspects, the additional SCI indicates a time range in which the one or more subsequent sidelink transmission opportunities are to occur, and the additional SCI indicates that all sidelink transmission opportunities, associated with a particular source identifier, within the time range are canceled.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
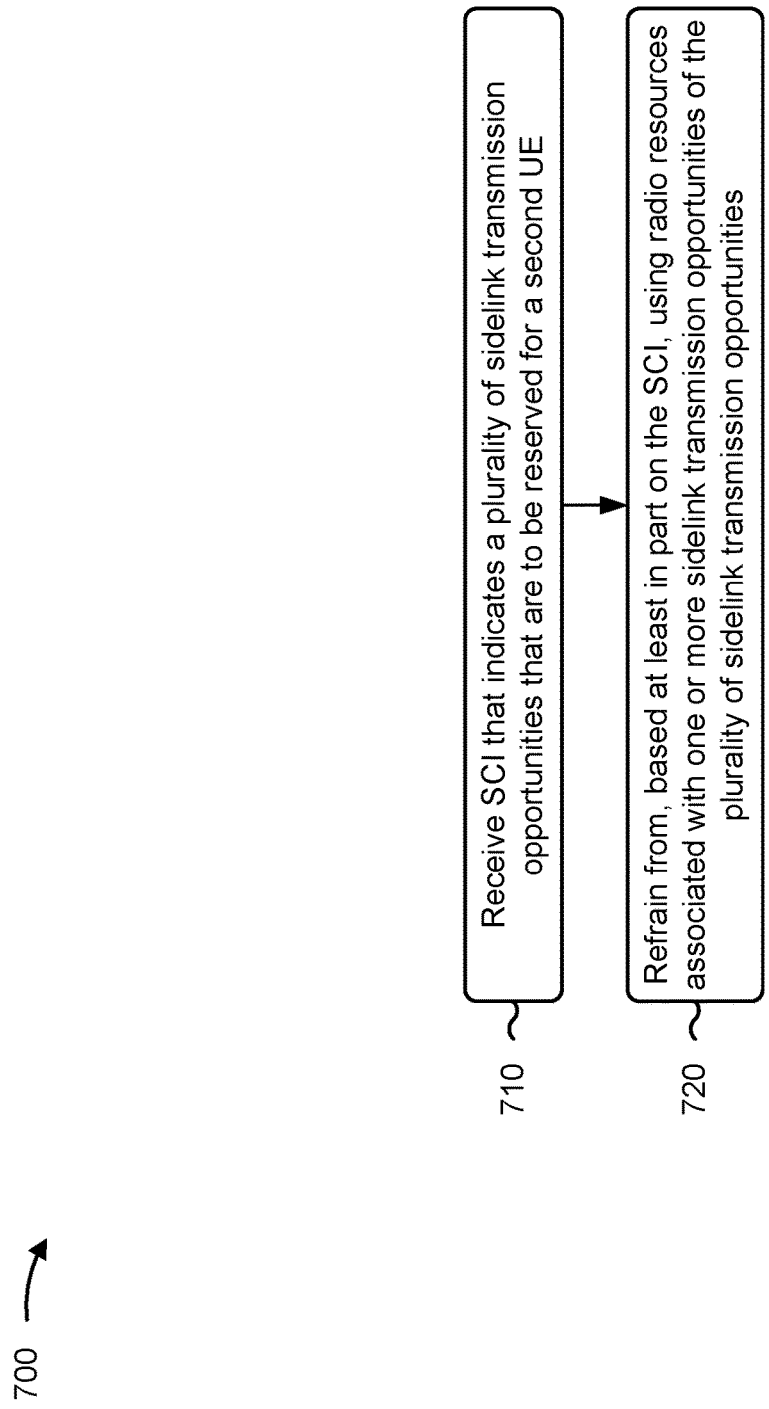

FIG. 7 is a diagram illustrating an example process 700 performed, for example, by a first UE, in accordance with the present disclosure. Example process 700 is an example where the UE (e.g., UE 120) performs operations associated with multiple transmission opportunity resource reservation for sidelink communication.

As shown in FIG. 7, in some aspects, process 700 may include receiving SCI that indicates a plurality of sidelink transmission opportunities that are to be reserved for a second UE (block 710). For example, the UE (e.g., using antenna 252, demodulator 254, MIMO detector 256, receive processor 258, controller/processor 280, memory 282, and/or reception component 802) may receive SCI that indicates a plurality of sidelink transmission opportunities that are to be reserved for a second UE, as described above.

As further shown in FIG. 7, in some aspects, process 700 may include refraining from, based at least in part on the SCI, using radio resources associated with one or more sidelink transmission opportunities of the plurality of sidelink transmission opportunities (block 720). For example, the UE (e.g., using antenna 252, transmit processor 264, TX MIMO processor 266, modulator 254, controller/processor 280, memory 282, and/or transmission component 804) may refrain from, based at least in part on the SCI, using radio resources associated with one or more sidelink transmission opportunities of the plurality of sidelink transmission opportunities, as described above.

Process 700 may include additional aspects, such as any single aspect or any combination of aspects described below and/or in connection with one or more other processes described elsewhere herein.

In a first aspect, an SCI-1 component of the SCI indicates the plurality of sidelink transmission opportunities. In a second aspect, alone or in combination with the first aspect, process 700 includes refraining from (e.g., using controller/processor 280, transmit processor 264, TX MIMO processor 266, MOD 254, antenna 252, memory 282, and/or transmission component 804), based at least in part on the SCI, using at least a subset of radio resources associated with one or more channel access gaps for the one or more sidelink transmission opportunities.

In a third aspect, alone or in combination with one or more of the first and second aspects, process 700 includes transmitting (e.g., using controller/processor 280, transmit processor 264, TX MIMO processor 266, MOD 254, antenna 252, memory 282, and/or transmission component 804) a sidelink communication in a radio resource that is frequency division multiplexed with a sidelink transmission opportunity of the plurality of sidelink transmission opportunities. In a fourth aspect, alone or in combination with one or more of the first through third aspects, the SCI indicates at least one of respective time-domain locations for each of the plurality of sidelink transmission opportunities, or one or more frequency-domain resources for the plurality of sidelink transmission opportunities.

In a fifth aspect, alone or in combination with one or more of the first through fourth aspects, the SCI includes a plurality of existing fields that are repurposed to indicate an offset between transmission of the SCI and a time-domain location of a first sidelink transmission opportunity of the plurality of sidelink transmission opportunities, and respective time-domain locations for each of the plurality of sidelink transmission opportunities relative to the offset. In a sixth aspect, alone or in combination with one or more of the first through fifth aspects, the SCI includes a plurality of new fields indicating at least one of an offset between transmission of the SCI and a time-domain location of a first sidelink transmission opportunity of the plurality of sidelink transmission opportunities, respective time-domain locations for each of the plurality of sidelink transmission opportunities relative to the offset, a quantity of the plurality of sidelink transmission opportunities, or one or more frequency-domain resources for the plurality of sidelink transmission opportunities.

In a seventh aspect, alone or in combination with one or more of the first through sixth aspects, the SCI includes information associated with a channel access gap size for the plurality of sidelink transmission opportunities, and process 700 further comprises determining the channel access gap size based at least in part on the information associated with the channel access gap size. In an eighth aspect, alone or in combination with one or more of the first through seventh aspects, the information associated with the channel access gap size comprises at least one of a sidelink CAPC for the plurality of sidelink transmission opportunities, an explicit indication of the channel access gap size as a time duration, an explicit indication of the channel access gap size as a quantity of time-domain resources, or a codeword size for the plurality of sidelink transmission opportunities.

In a ninth aspect, alone or in combination with one or more of the first through eighth aspects, process 700 includes transmitting (e.g., using controller/processor 280, transmit processor 264, TX MIMO processor 266, MOD 254, antenna 252, memory 282, and/or transmission component 804) a first sidelink communication prior to a channel access gap associated with a sidelink transmission opportunity of the plurality of sidelink transmission opportunities in place of a second sidelink communication based at least in part on a duration of the first sidelink communication being shorter than a duration of the second sidelink communication. In a tenth aspect, alone or in combination with one or more of the first through ninth aspects, process 700 includes determining (e.g., using receive processor 258, transmit processor 264, controller/processor 280, memory 282, and/or determination component 810) that the duration of the first sidelink communication is shorter than the duration of the second sidelink communication based at least in part on an indication of the duration of the first sidelink communication and an indication of the duration of the second sidelink communication in an SCI-1 component of the SCI.

In an eleventh aspect, alone or in combination with one or more of the first through tenth aspects, process 700 includes determining (e.g., using receive processor 258, transmit processor 264, controller/processor 280, memory 282, and/or determination component 810) that a signal measurement of a sidelink communication in which the SCI was received does not satisfy a threshold, and transmitting (e.g., using controller/processor 280, transmit processor 264, TX MIMO processor 266, MOD 254, antenna 252, memory 282, and/or transmission component 804) another sidelink communication during a channel access gap associated with a sidelink transmission opportunity of the plurality of sidelink transmission opportunities. In a twelfth aspect, alone or in combination with one or more of the first through eleventh aspects, process 700 includes receiving (e.g., using antenna 252, DEMOD 254, MIMO detector 256, receive processor 258, controller/processor 280, memory 282, and/or reception component 802) an SCI-2 component of the SCI, wherein the SCI-2 component includes an indication that the second UE obtained a sidelink channel for a COT, and transmitting (e.g., using controller/processor 280, transmit processor 264, TX MIMO processor 266, MOD 254, antenna 252, memory 282, and/or transmission component 804) a sidelink communication during a sidelink transmission opportunity, of the plurality of sidelink transmission opportunities, that occur during the COT based at least in part on the indication that the second UE obtained the sidelink channel for the COT.

In a thirteenth aspect, alone or in combination with one or more of the first through twelfth aspects, process 700 includes receiving (e.g., using antenna 252, DEMOD 254, MIMO detector 256, receive processor 258, controller/processor 280, memory 282, and/or reception component 802) an SCI-2 component of the SCI, wherein the SCI-2 component includes an indication that the second UE obtained a sidelink channel for a COT, and transmitting (e.g., using controller/processor 280, transmit processor 264, TX MIMO processor 266, MOD 254, antenna 252, memory 282, and/or transmission component 804) another sidelink communication during one or more other sidelink transmission opportunities, of the plurality of sidelink transmission opportunities, that occur during the COT based at least in part on the indication that the second UE obtained the sidelink channel for the COT. In a fourteenth aspect, alone or in combination with one or more of the first through thirteenth aspects, process 700 includes receiving (e.g., using antenna 252, DEMOD 254, MIMO detector 256, receive processor 258, controller/processor 280, memory 282, and/or reception component 802) additional SCI during a sidelink transmission opportunity of the one or more sidelink transmission opportunities, determining (e.g., using receive processor 258, transmit processor 264, controller/processor 280, memory 282, and/or determination component 810) that a source identifier associated with the SCI and a source identifier associated with the additional SCI are a same source identifier, and determining (e.g., using receive processor 258, transmit processor 264, controller/processor 280, memory 282, and/or determination component 810) that one or more other sidelink transmission opportunities of the plurality of sidelink transmission opportunities are canceled based at least in part on determining that the source identifier associated with the SCI and the source identifier associated with the additional SCI are the same source identifier.

In a fifteenth aspect, alone or in combination with one or more of the first through fourteenth aspects, process 700 includes receiving (e.g., using antenna 252, DEMOD 254, MIMO detector 256, receive processor 258, controller/processor 280, memory 282, and/or reception component 802), in a sidelink transmission opportunity of the one or more sidelink transmission opportunities, additional SCI explicitly indicating that one or more other sidelink transmission opportunities of the plurality of sidelink transmission opportunities are canceled. In a sixteenth aspect, alone or in combination with one or more of the first through fifteenth aspects, the additional SCI includes an SCI-2 component indicating that the one or more other sidelink transmission opportunities are canceled.

In a seventeenth aspect, alone or in combination with one or more of the first through sixteenth aspects, the one or more other sidelink transmission opportunities are indicated in the SCI as being associated with at least one of a source identifier associated with the second UE, or a destination identifier associated with the first UE. In an eighteenth aspect, alone or in combination with one or more of the first through seventeenth aspects, the additional SCI indicates a time range in which the one or more other sidelink transmission opportunities are to occur, and the additional SCI indicates that all sidelink transmission opportunities, associated with a source identifier associated with the second UE, within the time range are canceled.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a block diagram of an example apparatus 800 for wireless communication. The apparatus 800 may be a UE 120, or a UE 120 may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE 120, a base station 110, or another wireless communication device) using the reception component 802 and the transmission component 804. As further shown, the apparatus 800 may include one or more of a configuration component 808 or a determination component 810, among other examples.

In some aspects, the apparatus 800 may be configured to perform one or more operations described herein in connection with FIGS. 5A-5H. Additionally or alternatively, the apparatus 800 may be configured to perform one or more processes described herein, such as process 600 of FIG. 6, process 700 of FIG. 7, or a combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE 120 described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE 120 described above in connection with FIG. 2. In some aspects, the transmission component 804 may be collocated with the reception component 802 in a transceiver.

In some aspects, the configuration component 808 configures SCI to indicate a plurality of sidelink transmission opportunities that are to be reserved for the apparatus 800. In some aspects, the configuration component 808 configures the SCI to indicate information associated with a channel access gap size for the plurality of sidelink transmission opportunities. In some aspects, the configuration component 808 may include one or more of a receive processor 258, a transmit processor 264, a controller/processor 280, a memory 282, or a combination thereof, of the UE 120 described above in connection with FIG. 2. In some aspects, transmission component 804 transmits the SCI to one or more other apparatuses 806.

In some aspects, the configuration component 808 configures an SCI-2 component of additional SCI to indicate that the one or more subsequent sidelink transmission opportunities are canceled. In some aspects, transmission component 804 transmits, in a sidelink transmission opportunity of the plurality of sidelink transmission opportunities, the additional SCI indicating that the one or more subsequent sidelink transmission opportunities are canceled.

In some aspects, the reception component 802 receives SCI from an apparatus 806 that indicates a plurality of sidelink transmission opportunities that are to be reserved for the apparatus 806. In some aspects, the transmission component 804 refrains from, based at least in part on the SCI, using radio resources associated with one or more sidelink transmission opportunities of the plurality of sidelink transmission opportunities.

In some aspects, the SCI includes information associated with a channel access gap size for the plurality of sidelink transmission opportunities, and the determination component 810 determines the channel access gap size based at least in part on the information associated with the channel access gap size. In some aspects, the determination component 810 may include one or more of a receive processor 258, a transmit processor 264, a controller/processor 280, a memory 282, or a combination thereof, of the UE 120 described above in connection with FIG. 2. In some aspects, the transmission component 804 transmits a first sidelink communication prior to a channel access gap associated with a sidelink transmission opportunity of the plurality of sidelink transmission opportunities in place of a second sidelink communication based at least in part on a duration of the first sidelink communication being shorter than a duration of the second sidelink communication. In some aspects, the determination component 810 determines that the duration of the first sidelink communication is shorter than the duration of the second sidelink communication based at least in part on an indication of the duration of the first sidelink communication and an indication of the duration of the second sidelink communication in an SCI-1 component of the SCI.

In some aspects, the determination component 810 determines that a signal measurement of a sidelink communication in which the SCI was received does not satisfy a threshold. In some aspects, the transmission component 804 transmits another sidelink communication during a channel access gap associated with a sidelink transmission opportunity of the plurality of sidelink transmission opportunities. In some aspects, the reception component 802 receives additional SCI during a sidelink transmission opportunity of the one or more sidelink transmission opportunities. In some aspects, the determination component 810 determines that a source identifier associated with the SCI and a source identifier associated with the additional SCI are a same source identifier, and determines that one or more other sidelink transmission opportunities of the plurality of sidelink transmission opportunities are canceled based at least in part on determining that the source identifier associated with the SCI and the source identifier associated with the additional SCI are the same source identifier.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: configuring sidelink control information (SCI) to indicate a plurality of sidelink transmission opportunities that are to be reserved for the UE; and transmitting the SCI to one or more other UEs.

Aspect 2: The method of Aspect 1, wherein configuring the SCI to indicate the plurality of sidelink transmission opportunities comprises: configuring an SCI part 1 (SCI-1)

component of the SCI to indicate the plurality of sidelink transmission opportunities. Aspect 3: The method of Aspect 1 or 2, wherein the SCI indicates at least one of: respective time-domain locations for each of the plurality of sidelink transmission opportunities, or one or more frequency-domain resources for the plurality of sidelink transmission opportunities. Aspect 4: The method of any of Aspects 1-3, wherein the SCI includes a plurality of existing fields that are repurposed to indicate: an offset between transmission of the SCI and a time-domain location of a first sidelink transmission opportunity of the plurality of sidelink transmission opportunities, and respective time-domain locations for each of the plurality of sidelink transmission opportunities relative to the offset.

Aspect 5: The method of any of Aspects 1-4, wherein the SCI includes a plurality of new fields indicating at least one of: an offset between transmission of the SCI and a time-domain location of a first sidelink transmission opportunity of the plurality of sidelink transmission opportunities, respective time-domain locations for each of the plurality of sidelink transmission opportunities relative to the offset, a quantity of the plurality of sidelink transmission opportunities, or one or more frequency-domain resources for the plurality of sidelink transmission opportunities.

Aspect 6: The method of any of Aspects 1-5, further comprising: configuring the SCI to indicate information associated with a channel access gap size for the plurality of sidelink transmission opportunities.

Aspect 7: The method of Aspect 6, wherein the information associated with the channel access gap size comprises at least one of: a sidelink channel access priority class (CAPC) for the plurality of sidelink transmission opportunities, an explicit indication of the channel access gap size as a time duration, an explicit indication of the channel access gap size as a quantity of time-domain resources, or a codeword size for the plurality of sidelink transmission opportunities. Aspect 8: The method of any of Aspects 1-7, further comprising: transmitting, in a sidelink transmission opportunity of the plurality of sidelink transmission opportunities, additional SCI indicating that one or more subsequent sidelink transmission opportunities are canceled. Aspect 9: The method of Aspect 8, further comprising: configuring an SCI part 2 (SCI-2) component of the additional SCI to indicate that the one or more subsequent sidelink transmission opportunities are canceled.

Aspect 10: The method of Aspect 8 or 9, wherein the one or more subsequent sidelink transmission opportunities are indicated in the SCI as being associated with at least one of: a source identifier associated with the UE, or a destination identifier associated with a second UE of the one or more UEs. Aspect 11: The method of any of Aspects 8-10, wherein the additional SCI indicates a time range in which the one or more subsequent sidelink transmission opportunities are to occur; and wherein the additional SCI indicates that all sidelink transmission opportunities, associated with a particular source identifier, within the time range are canceled.

Aspect 12: A method of wireless communication performed by a first user equipment (UE), comprising: receiving sidelink control information (SCI) that indicates a plurality of sidelink transmission opportunities that are to be reserved for a second UE; and refraining from, based at least in part on the SCI, using radio resources associated with one or more sidelink transmission opportunities of the plurality of sidelink transmission opportunities.

Aspect 13: The method of Aspect 12, wherein an SCI part 1 (SCI-1) component of the SCI indicates the plurality of sidelink transmission opportunities.

Aspect 14: The method of Aspect 12 or 13, further comprising: refraining from, based at least in part on the SCI, using at least a subset of radio resources associated with one or more channel access gaps for the one or more sidelink transmission opportunities.

Aspect 15: The method of any of Aspects 12-14, further comprising: transmitting a sidelink communication in a radio resource that is frequency division multiplexed with a sidelink transmission opportunity of the plurality of sidelink transmission opportunities.

Aspect 16: The method of any of Aspects 12-15, wherein the SCI indicates at least one of: respective time-domain locations for each of the plurality of sidelink transmission opportunities, or one or more frequency-domain resources for the plurality of sidelink transmission opportunities.

Aspect 17: The method of any of Aspects 12-16, wherein the SCI includes a plurality of existing fields that are repurposed to indicate: an offset between transmission of the SCI and a time-domain location of a first sidelink transmission opportunity of the plurality of sidelink transmission opportunities, and respective time-domain locations for each of the plurality of sidelink transmission opportunities relative to the offset. Aspect 18: The method of any of Aspects 12-17, wherein the SCI includes a plurality of new fields indicating at least one of: an offset between transmission of the SCI and a time-domain location of a first sidelink transmission opportunity of the plurality of sidelink transmission opportunities, respective time-domain locations for each of the plurality of sidelink transmission opportunities relative to the offset, a quantity of the plurality of sidelink transmission opportunities, or one or more frequency-domain resources for the plurality of sidelink transmission opportunities.

Aspect 19: The method of any of Aspects 12-18, wherein the SCI includes information associated with a channel access gap size for the plurality of sidelink transmission opportunities; and wherein the method further comprises: determining the channel access gap size based at least in part on the information associated with the channel access gap size. Aspect 20: The method of Aspect 19, wherein the information associated with the channel access gap size comprises at least one of: a sidelink channel access priority class (CAPC) for the plurality of sidelink transmission opportunities, an explicit indication of the channel access gap size as a time duration, an explicit indication of the channel access gap size as a quantity of time-domain resources, or a codeword size for the plurality of sidelink transmission opportunities.

Aspect 21: The method of Aspect 19 or 20, further comprising: transmitting a first sidelink communication prior to a channel access gap associated with a sidelink transmission opportunity of the plurality of sidelink transmission opportunities in place of a second sidelink communication based at least in part on a duration of the first sidelink communication being shorter than a duration of the second sidelink communication. Aspect 22: The method of Aspect 21, further comprising: determining that the duration of the first sidelink communication is shorter than the duration of the second sidelink communication based at least in part on an indication of the duration of the first sidelink communication and an indication of the duration of the second sidelink communication in an SCI part 1 (SCI-1) component of the SCI.

Aspect 23: The method of any of Aspects 12-22, further comprising: determining that a signal measurement of a sidelink communication in which the SCI was received does not satisfy a threshold; and transmitting another sidelink communication during a channel access gap associated with a sidelink transmission opportunity of the plurality of sidelink transmission opportunities. Aspect 24: The method of any of Aspects 12-23, further comprising: receiving an SCI part 2 (SCI-2) component of the SCI, wherein the SCI-2 component includes an indication that the second UE obtained a sidelink channel for a channel occupancy time (COT); and transmitting a sidelink communication during a channel access gap associated with a sidelink transmission opportunity, of the plurality of sidelink transmission opportunities, that occurs during the COT based at least in part on the indication that the second UE obtained the sidelink channel for the COT. Aspect 25: The method of any of Aspects 12-24, further comprising: receiving an SCI part 2 (SCI-2) component of the SCI, wherein the SCI-2 component includes an indication that the second UE obtained a sidelink channel for a channel occupancy time (COT); and transmitting a sidelink communication during one or more other sidelink transmission opportunities, of the plurality of sidelink transmission opportunities, that occur during the COT based at least in part on the indication that the second UE obtained the sidelink channel for the COT wherein the SCI-2 component includes an indication that the second UE obtained a sidelink channel for a channel occupancy time (COT); and transmitting a sidelink communication during one or more other sidelink transmission opportunities, of the plurality of sidelink transmission opportunities, that occur during the COT based at least in part on the indication that the second UE obtained the sidelink channel for the COT Aspect 26: The method of any of Aspects 12-25, further comprising: receiving additional SCI during a sidelink transmission opportunity of the one or more sidelink transmission opportunities; determining that a source identifier associated with the SCI and a source identifier associated with the additional SCI are a same source identifier; and determining that one or more other sidelink transmission opportunities of the plurality of sidelink transmission opportunities are canceled based at least in part on determining that the source identifier associated with the SCI and the source identifier associated with the additional SCI are the same source identifier. Aspect 27: The method of any of Aspects 12-26, further comprising: receiving, in a sidelink transmission opportunity of the one or more sidelink transmission opportunities, additional SCI explicitly indicating that one or more other sidelink transmission opportunities of the plurality of sidelink transmission opportunities are canceled.

Aspect 28: The method of Aspect 27, wherein the additional SCI includes an SCI part 2 (SCI-2) component indicating that the one or more other sidelink transmission opportunities are canceled. Aspect 29: The method of Aspect 27 or 28, wherein the one or more other sidelink transmission opportunities are indicated in the SCI as being associated with at least one of: a source identifier associated with the second UE, or a destination identifier associated with the first UE. Aspect 30: The method of any of Aspects 27-29, wherein the additional SCI indicates a time range in which the one or more other sidelink transmission opportunities are to occur; and wherein the additional SCI indicates that all sidelink transmission opportunities, associated with a source identifier associated with the second UE, within the time range are canceled.

Aspect 31: An apparatus for wireless communication at a device, comprising: a processor; memory coupled with the processor; and instructions stored in the memory and executable by the processor to cause the apparatus to perform the method of one or more of Aspects 1-11. Aspect 32: A device for wireless communication, comprising a memory and one or more processors coupled to the memory, the one or more processors configured to perform the method of one or more of Aspects 1-11. Aspect 33: An apparatus for wireless communication, comprising at least one means for performing the method of one or more of Aspects 1-11.

Aspect 34: A non-transitory computer-readable medium storing code for wireless communication, the code comprising instructions executable by a processor to perform the method of one or more of Aspects 1-11. Aspect 35: A non-transitory computer-readable medium storing a set of instructions for wireless communication, the set of instructions comprising one or more instructions that, when executed by one or more processors of a device, cause the device to perform the method of one or more of Aspects 1-11.

Aspect 31: An apparatus for wireless communication at a device, comprising a processor; memory coupled with the processor; and instructions stored in the memory and executable by the processor to cause the apparatus to perform the method of one or more of Aspects 12-30. Aspect 32: A device for wireless communication, comprising a memory and one or more processors coupled to the memory, the one or more processors configured to perform the method of one or more of Aspects 12-30. Aspect 33: An apparatus for wireless communication, comprising at least one means for performing the method of one or more of Aspects 12-30.

Aspect 34: A non-transitory computer-readable medium storing code for wireless communication, the code comprising instructions executable by a processor to perform the method of one or more of Aspects 12-30. Aspect 35: A non-transitory computer-readable medium storing a set of instructions for wireless communication, the set of instructions comprising one or more instructions that, when executed by one or more processors of a device, cause the device to perform the method of one or more of Aspects 12-30.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:
   receiving sidelink control information (SCI) that indicates a plurality of sidelink transmission opportunities that are to be reserved for a second UE, wherein the SCI includes information associated with a channel access gap size for the plurality of sidelink transmission opportunities;
   refraining from, based at least in part on the SCI, using radio resources associated with one or more sidelink transmission opportunities of the plurality of sidelink transmission opportunities:
   determining the channel access gap size based at least in part on the information associated with the channel access gap size;
   transmitting a first sidelink communication prior to a channel access gap associated with a sidelink transmission opportunity of the plurality of sidelink transmission opportunities in place of a second sidelink communication based at least in part on a duration of the first sidelink communication being shorter than a duration of the second sidelink communication; and
   determining that the duration of the first sidelink communication is shorter than the duration of the second sidelink communication based at least in part on an indication of the duration of the first sidelink communication and an indication of the duration of the second sidelink communication in an SCI part 1 (SCI-1) component of the SCI.

2. The method of claim 1, wherein an SCI part 1 (SCI-1) component of the SCI indicates the plurality of sidelink transmission opportunities.

3. The method of claim 1, further comprising:
   refraining from, based at least in part on the SCI, using at least a subset of radio resources associated with one or more channel access gaps for the one or more sidelink transmission opportunities.

4. The method of claim 1, further comprising:
   transmitting a sidelink communication in a radio resource that is frequency division multiplexed with a sidelink transmission opportunity of the plurality of sidelink transmission opportunities.

5. The method of claim 1, wherein the SCI indicates at least one of:
   respective time-domain locations for each of the plurality of sidelink transmission opportunities, or
   one or more frequency-domain resources for the plurality of sidelink transmission opportunities.

6. The method of claim 1, wherein the SCI includes a plurality of existing fields that are repurposed to indicate:
   an offset between transmission of the SCI and a time-domain location of a first sidelink transmission opportunity of the plurality of sidelink transmission opportunities, and
   respective time-domain locations for each of the plurality of sidelink transmission opportunities relative to the offset.

7. The method of claim 1, wherein the SCI includes a plurality of new fields indicating at least one of:
   an offset between transmission of the SCI and a time-domain location of a first sidelink transmission opportunity of the plurality of sidelink transmission opportunities,
   respective time-domain locations for each of the plurality of sidelink transmission opportunities relative to the offset,
   a quantity of the plurality of sidelink transmission opportunities, or
   one or more frequency-domain resources for the plurality of sidelink transmission opportunities.

8. The method of claim 1, wherein the information associated with the channel access gap size comprises at least one of:
   a sidelink channel access priority class (CAPC) for the plurality of sidelink transmission opportunities,
   an explicit indication of the channel access gap size as a time duration,
   an explicit indication of the channel access gap size as a quantity of time domain resources, or
   a codeword size for the plurality of sidelink transmission opportunities.

9. A first user equipment (UE) for wireless communication, comprising:
   a memory; and
   one or more processors coupled to the memory, the one or more processors configured to:
   receive sidelink control information (SCI) that indicates a plurality of sidelink transmission opportunities that are to be reserved for a second UE;
   refrain from, based at least in part on the SCI, using radio resources associated with one or more sidelink transmission opportunities of the plurality of sidelink transmission opportunities;

receive additional SCI during a sidelink transmission opportunity of the one or more sidelink transmission opportunities;

determine that a source identifier associated with the SCI and a source identifier associated with the additional SCI are a same source identifier; and determine that one or more other sidelink transmission opportunities of the plurality of sidelink transmission opportunities are canceled based at least in part on determining that the source identifier associated with the SCI and the source identifier associated with the additional SCI are the same source identifier.

10. The first UE of claim 9, wherein the one or more processors are further configured to:

determine that a signal measurement of a sidelink communication in which the SCI was received does not satisfy a threshold; and transmit another sidelink communication during a channel access gap associated with a sidelink transmission opportunity of the plurality of sidelink transmission opportunities.

11. The first UE of claim 9, wherein the one or more processors are further configured to:

receive an SCI part 2 (SCI-2) component of the SCI, wherein the SCI-2 component includes an indication that the second UE obtained a sidelink channel for a channel occupancy time (COT); and transmit a sidelink communication during a sidelink transmission opportunity, of the plurality of sidelink transmission opportunities, that occur during the COT based at least in part on the indication that the second UE obtained the sidelink channel for the COT.

12. The first UE of claim 9, wherein the one or more processors are further configured to:

receive an SCI part 2 (SCI-2) component of the SCI, wherein the SCI-2 component includes an indication that the second UE obtained a sidelink channel for a channel occupancy time (COT); and transmit another sidelink communication during one or more other sidelink transmission opportunities, of the plurality of sidelink transmission opportunities, that occur during the COT based at least in part on the indication that the second UE obtained the sidelink channel for the COT.

13. The first UE of claim 9, wherein the one or more processors are further configured to:

receive, in a sidelink transmission opportunity of the one or more sidelink transmission opportunities, additional SCI explicitly indicating that one or more other sidelink transmission opportunities of the plurality of sidelink transmission opportunities are canceled.

14. The first UE of claim 13, wherein the additional SCI includes an SCI part 2 (SCI-2) component indicating that the one or more other sidelink transmission opportunities are canceled; and wherein the one or more other sidelink transmission opportunities are indicated in the SCI as being associated with at least one of:

a source identifier associated with the second UE, or a destination identifier associated with the first UE.

15. The first UE of claim 13, wherein the additional SCI indicates a time range in which the one or more other sidelink transmission opportunities are to occur; and wherein the additional SCI indicates that all sidelink transmission opportunities, associated with a source identifier associated with the second UE, within the time range are canceled.

* * * * *